United States Patent [19]

Yang

[11] Patent Number: 5,055,825
[45] Date of Patent: Oct. 8, 1991

[54] METHOD AND CIRCUIT FOR SELF-CHECKING TROUBLES OF A HEATING SYSTEM

[75] Inventor: Kap-Soo Yang, Seoul, Rep. of Korea

[73] Assignee: Hanil Industrial Co., Ltd., Rep. of Korea

[21] Appl. No.: 461,670

[22] Filed: Jan. 8, 1990

[30] Foreign Application Priority Data

Sep. 6, 1989 [KR] Rep. of Korea .................... 89-12887

[51] Int. Cl.$^5$ .......................................... B60Q 1/00
[52] U.S. Cl. ................... 340/439; 340/457.4; 340/525; 431/13; 431/18; 431/24; 169/60; 165/11.1; 364/424.03; 364/431.01; 364/550; 371/15.1
[58] Field of Search ..................... 340/439, 457.4, 525; 364/424.03, 431.01, 431.1, 550, 550.01; 431/13-15, 18, 24, 26; 169/60, 61, 23; 165/11.1, 11.2; 371/3, 4, 14, 18, 15.1; 237/1 R, 12.1

[56] References Cited
U.S. PATENT DOCUMENTS 4,053,868 10/1977 Cox et al. .......................... 340/525
4,593,357 6/1986 Van Ostrand et al. ............. 340/439
4,635,030 1/1987 Rauch ................................ 340/525

Primary Examiner—Donnie L. Crosland
Attorney, Agent, or Firm—Beveridge, DeGrandi & Weilacher

[57] ABSTRACT

A method and circuit for self-checking problems in a heating system for an automobile are disclosed. A self-checking and indicating process are disclosed which include a first preheating step; an ignition period; a second preheating step; a combustion period module; and an extinguishment step according to a program interrupt. Various checking steps are included, along with various subroutines for indicating errors. Errors are displayed and a stopping step is performed if the temperature checked and the various proceding checking steps indicate that error conditions exist. The present invention includes an indicating apparatus which includes an output part of a microprocessor which provides a fundamental memory, a data processor, an arithmetic and logic accumulation, and an interrupt. The microprocessor is connected to an output part of a driving apparatus, and a sensing part which senses the driving state of the output part, the ignition, the temperature, and a low voltage condition. The microprocessor communicates data with a timer display to indicate progressing control and a buzzer driving part.

18 Claims, 20 Drawing Sheets

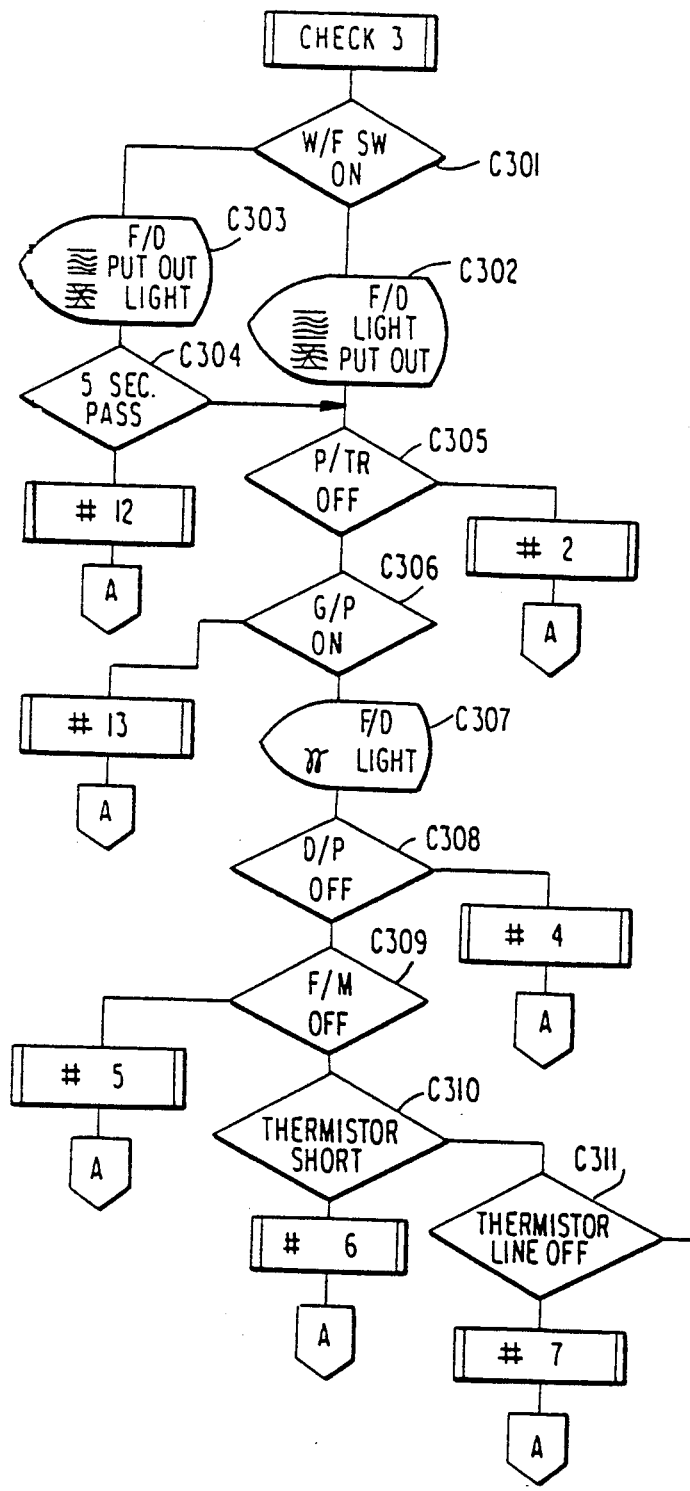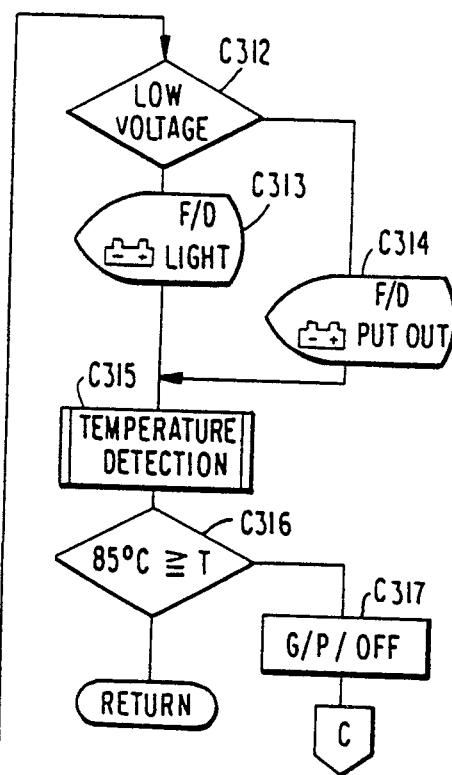
FIG. 7C

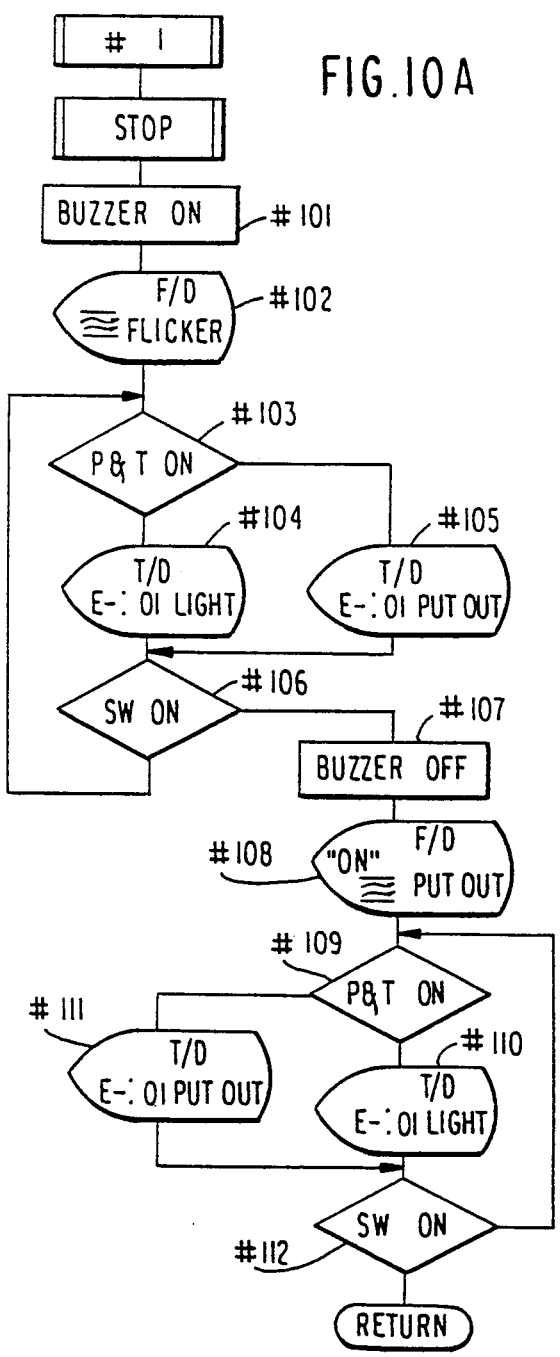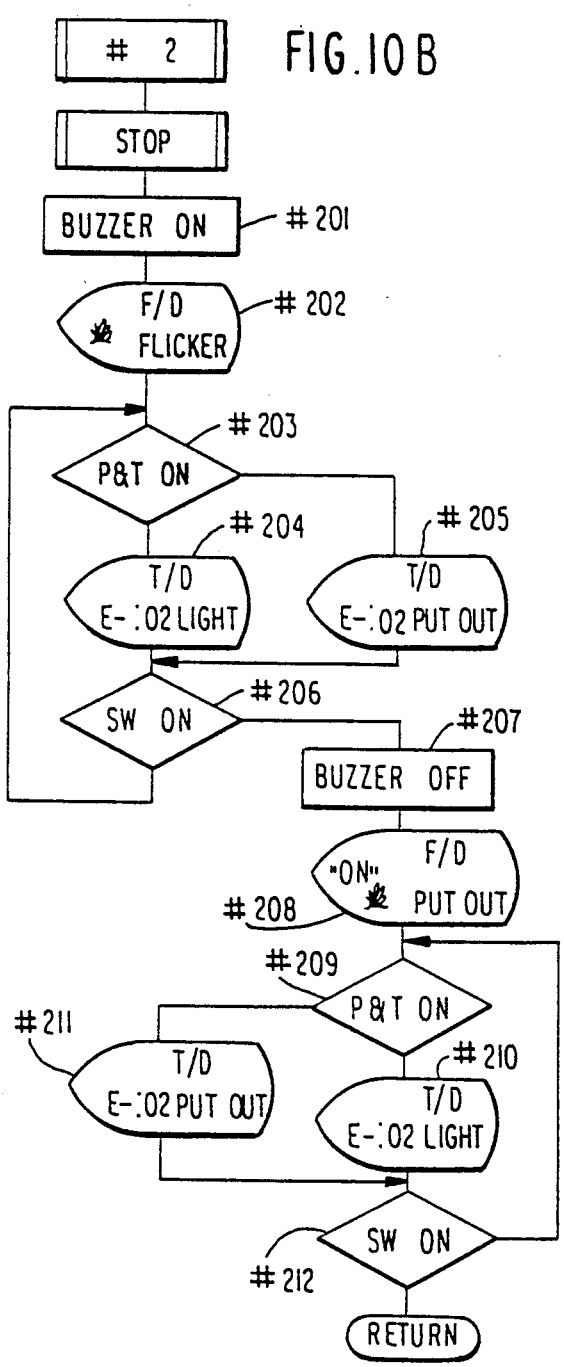

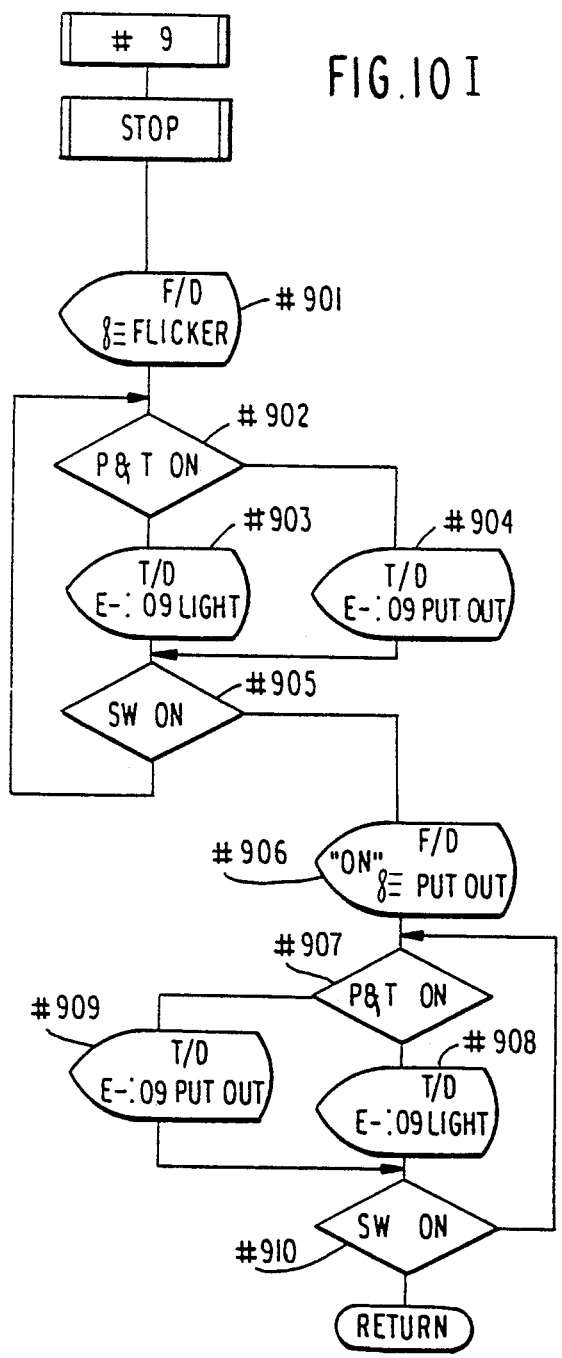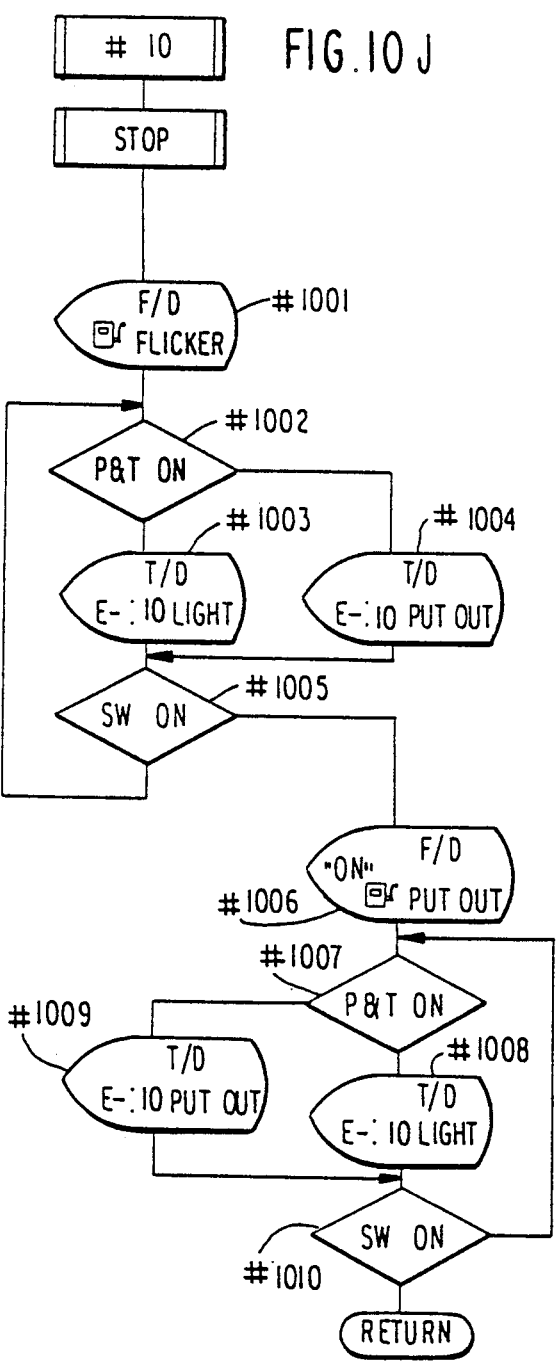

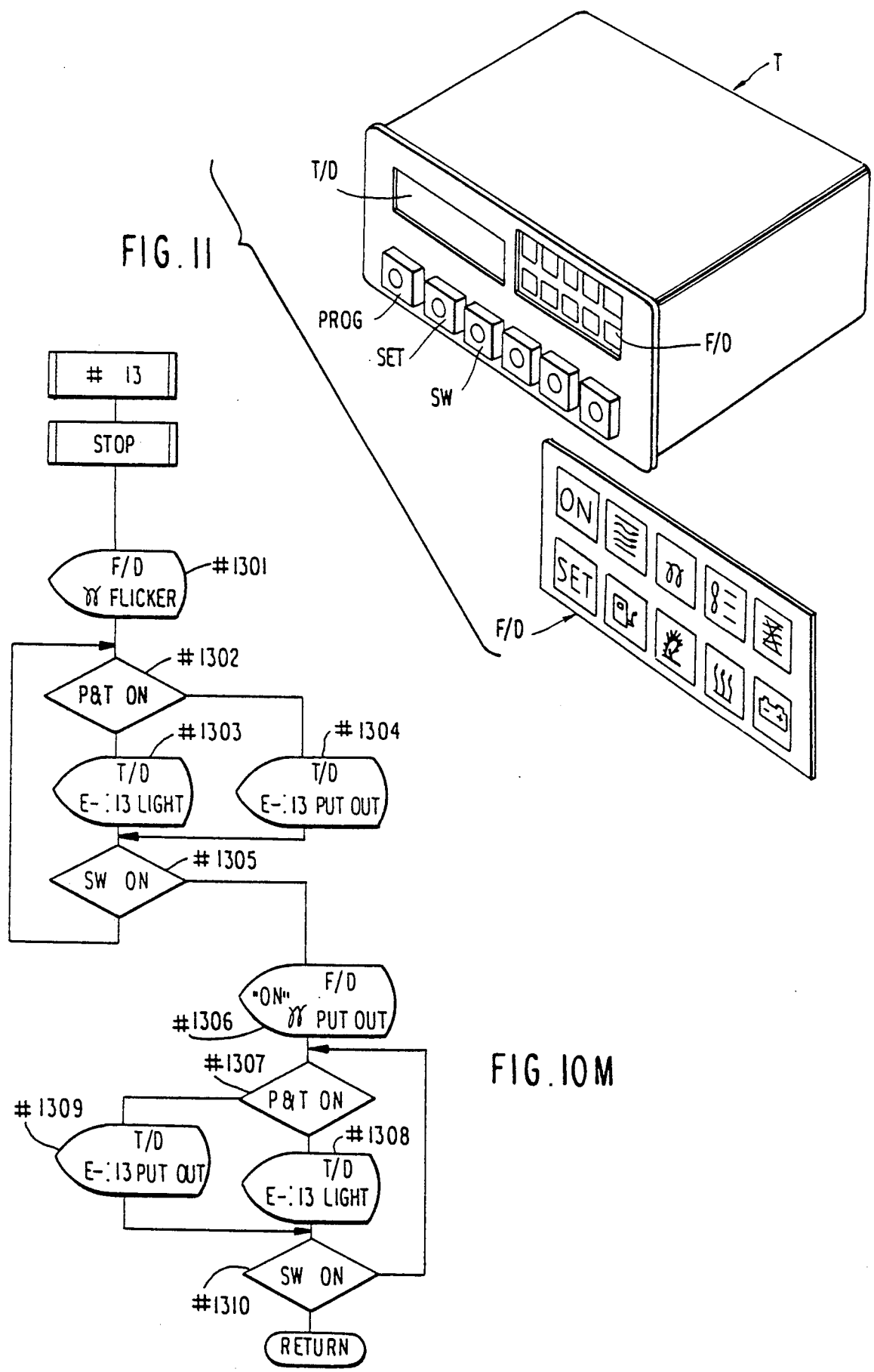

METHOD AND CIRCUIT FOR SELF-CHECKING TROUBLES OF A HEATING SYSTEM

BACKGROUND OF THE INVENTION

The present invention relates to a control system for the heating system of an automobile, and especially to a self-checking control system and method and indicating circuit which repeatedly performs the self-checking steps to detect problems in the heating system. When problems are detected by the control circuit, the control system stops the control process, and simultaneously gives a warning indication of a disordering state in the process of control.

Heating systems for automobiles are known which combine heating and preheating of the engine by including a special heating system, separate from the conventional heating system which uses the waste heat from the water of the engine coolant system. These types of heating systems are used in long distance cars, as well as in all types of ordinary cars.

Conventionally, in systems for detecting the cause of heating system problems, such as heater trouble, circular pump trouble, and battery deficiencies, the display of the trouble is usually restricted by using a fundamental sensor means to drive the sensor system. Minor displayers are used to display the cause of the trouble, depending on the type of trouble detected.

Accordingly, the range of trouble indication was broad, and the individual respective states of the various systems (i.e., the heater, circular pump or battery) could not be known. Furthermore, if the step of detection passed a system during the sequential control, it was possible to detect problems only when the systems are repeatedly checked.

These problems in the conventional systems induced misunderstandings in the user's mind as to the cause of the trouble. Even more alarming, the deficiencies in the conventional systems are potentially dangerous.

The principal concept of the present invention is similar to that described in Korean Patent Application No. 88-7980.

SUMMARY OF THE INVENTION

An object of the present invention is to solve the above mentioned problems in the conventional systems and to improve upon the systems shown in Korean Patent Application No. 88-7980 entitled, "CONTROL APPARATUS OF A HEATING SYSTEM FOR AN AUTOMOBILE".

An important object of this invention is to make the system repeatedly check for trouble. The control system will stop the operation or warn the operator when trouble is detected, and indicate the type of error detected by causing elements on a time displayer to display the error type. Accordingly, this invention not only improves security and reliability, but it enables the user to detect the problems easily.

In accordance with the present invention, the self-checking and indicating functions are performed by a process which includes a first preheating period; an ignition period; a second preheating period; a combustion period module; an extinguishment step according to a program interrupt; various self-checking steps; a step for ending the control performance; and a subroutine for indicating errors according to a temperature checking step and the preceding checking steps.

BRIEF DESCRIPTION OF THE DRAWINGS

FIGS. 7A to 7G are a series of flow charts for explaining the various self-checking steps, wherein:

FIG. 7A is a flow chart for explaining the first checking step (check 1);

FIG. 7B is a flow chart for explaining the second checking step (check 2);

FIG. 7C is a flow chart for explaining the third checking step (check 3);

FIG. 7D is a flow chart for explaining the fourth checking step (check 4);

FIG. 7E is a flow chart for explaining the fifth checking step (check 5);

FIG. 7F is a flow chart for explaining the sixth checking step (check 6); and

FIG. 7G is a flow chart for explaining the seventh checking step (check 7).

FIGS. 10A to 10M are a series of flow charts for explaining the subroutines used in the various error checking steps for indicating trouble in accordance with the present invention, wherein:

FIG. 10A is a flow diagram showing the error checking routine for indicating that the water pump's B+ terminal is shorted;

FIG. 10B is a flow diagram showing the error checking routine for indicating that the photo transistor (P/TR) is line-shorted;

FIG. 10C is a flow diagram showing the error checking routine for indicating that the ignition plug's B+ terminal is shorted;

FIG. 10D is a flow diagram showing the error checking routine for indicating that the fuel pump's B+ terminal is shorted;

FIG. 10E is a flow diagram showing the error checking routine for indicating that the air fan motor's B+ terminal is shorted;

FIG. 10F is a flow diagram showing the error checking routine for indicating that the thermistor is line-shorted;

FIG. 10G is a flow diagram showing the error checking routine for indicating a line-opened state of the thermistor;

FIG. 10H is a flow diagram showing the error checking routine for indicating a low voltage from the supplier;

FIG. 10I is a flow diagram showing the error checking routine for indicating a line-opened state of the air fan motor;

FIG. 10J is a flow diagram showing the error checking routine for indicating that the passive elements of the fuel pump's output part are decrepit;

FIG. 10K is a flow diagram showing the error checking routine for indicating that there is no checking ignition after the second preheating period;

FIG. 10L is a flow diagram showing the error checking routine for indicating a line-opened state of the water pump; and FIG. 10M is a flow diagram showing the error checking routine for indicating a line-opened state of the ignition plug.

FIG. 11 is a schematic view showing a timer display system which may be used in accordance with the present invention.

DETAILED DESCRIPTION OF THE INVENTION

The present invention will be described in more detail with reference to the accompanying drawings.

Figure 1:
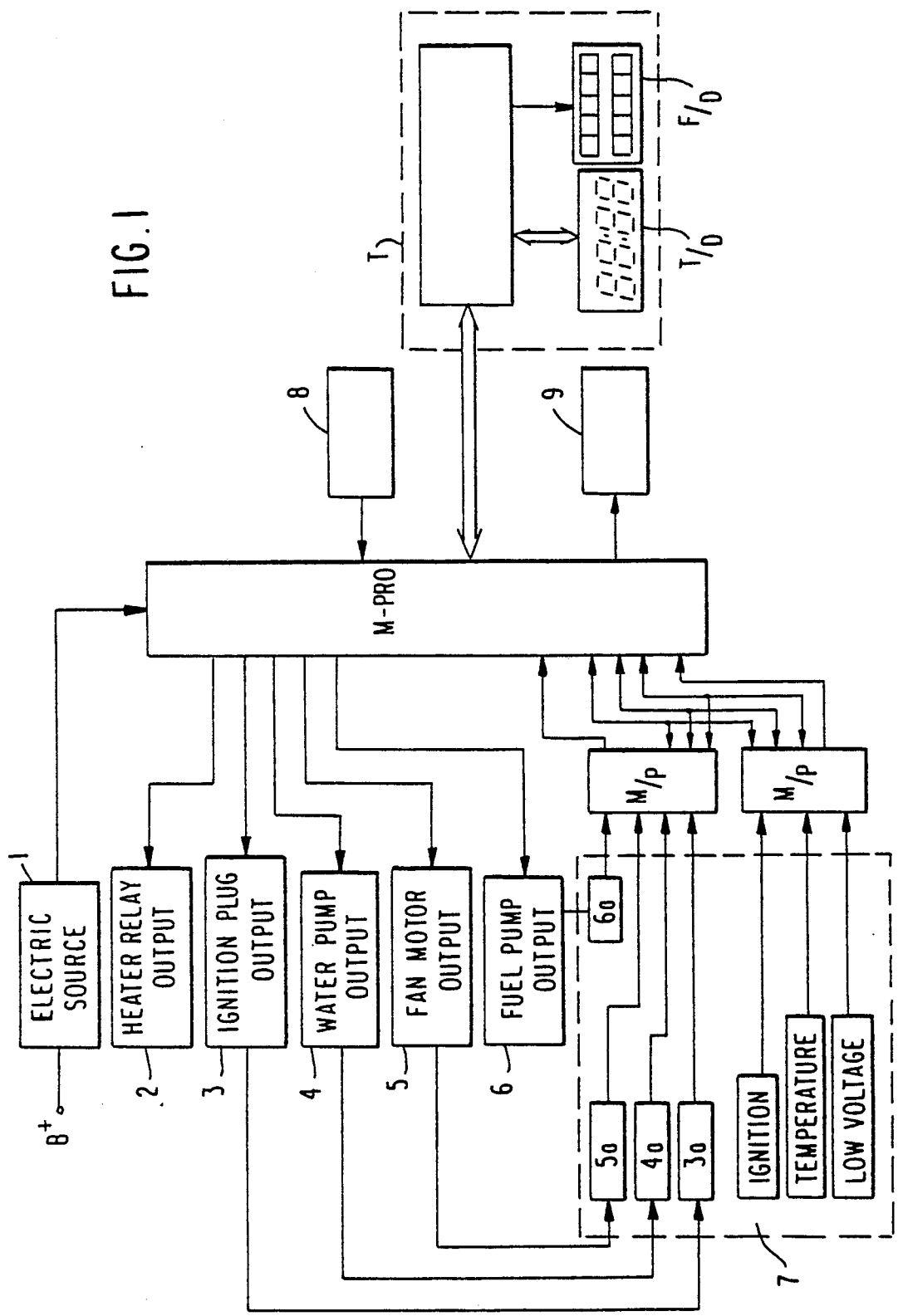
FIG. 1 is a block diagram which illustrates one embodiment of the present invention.

In the present invention, the overall control system, as shown in FIG. 1, is controlled by a microprocessor which functions as a memory, an arithmetic and logic operator, a data processor and an interrupt. A source part 1 is included to supply electric power for the microprocessor and each output part.

Each output part of the driving means 2, 3, 4, 5 and 6 in the heating system is controlled by receiving an input signal from an out port of the microprocessor. The heating system is directly driven by the output parts which are controlled by the microprocessor.

Each output part 3, 4, 5 and 6 has a sensor part 3a, 4a, 5a and 6a, respectively, so that the output of any of these sensors can be fed back to the microprocessor. The sensor 7 includes an ignition state, a temperature check, and a low voltage input and provides this information to the microprocessor. The sensor 7 and the sensor parts 3a, 4a, 5a and 6a are connected to the microprocessor through an eight input-multiplexer.

Furthermore, the time display T/D and the timer display F/D are driven by and input into the microprocessor for the purpose of communication between the operator and the microprocessor. At the same time, the buzzer driving part 9 is driven when a state of danger is detected, and the reset part 8 is used to reset the control processes. The buzzer driving part 9 and the reset part 8 are connected to the microprocessor.

An output from the output parts 3, 4, 5 and 6 goes to the sensor parts 3a, 4a, 5a and 6a. The sensor 7 sends control information along with the output from the sensor parts 3a, 4a, 5a and 6a, through an eight input multiplexer for expanding the input. The self-check in accordance with this invention is performed by feeding back into the microprocessor, the output from the sensors 2, 3, 4, 5, 6 and 7.

The error code and flicker are indicated on the display T/D and timer display F/D. The buzzer circuit is driven and an audible sound is produced in the event of an unexpected danger.

The control process will be described in more detail. For reference, throughout the flow diagrams, when a decision box is shown (i.e., diamond shaped box), a "YES" answer is represented by a vertical axis and a "No" answer is shown by a horizontal axis.

The fundamental control performance of this invention will now be described.

Figure 2:
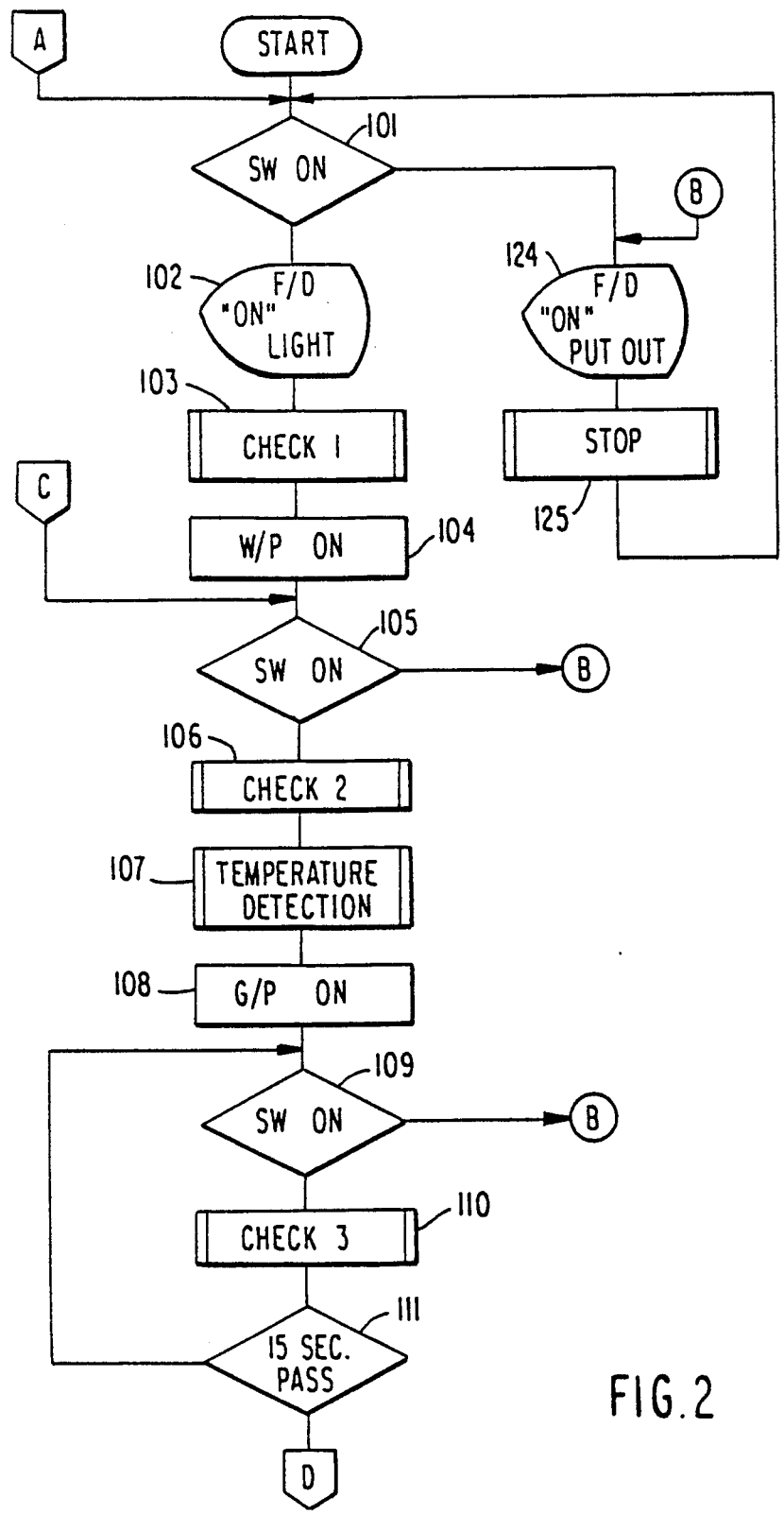
FIG. 2 is a flow chart for explaining the process of the first preheating period as a control performance step in accordance with the present invention.
Figure 8:
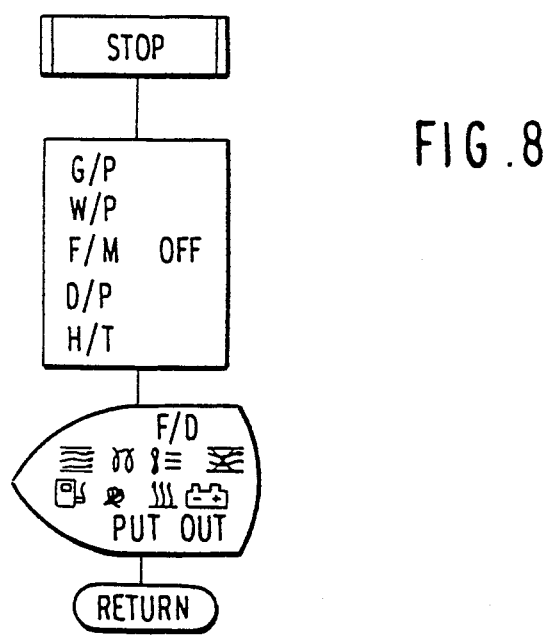
FIG. 8 is a flow chart for explaining the step of ending the control performance in accordance with the present invention.

In FIG. 2, the state of the hand operated switch (SW) is first checked. If SW is "Off", the controller calls a subroutine to perform the stopping step. This stopping subroutine (step 125) is shown in FIG. 8. But if SW is "On", the output of the microprocessor is used to turn on the "On" light "On" on the display F/D.

Figure 7A:
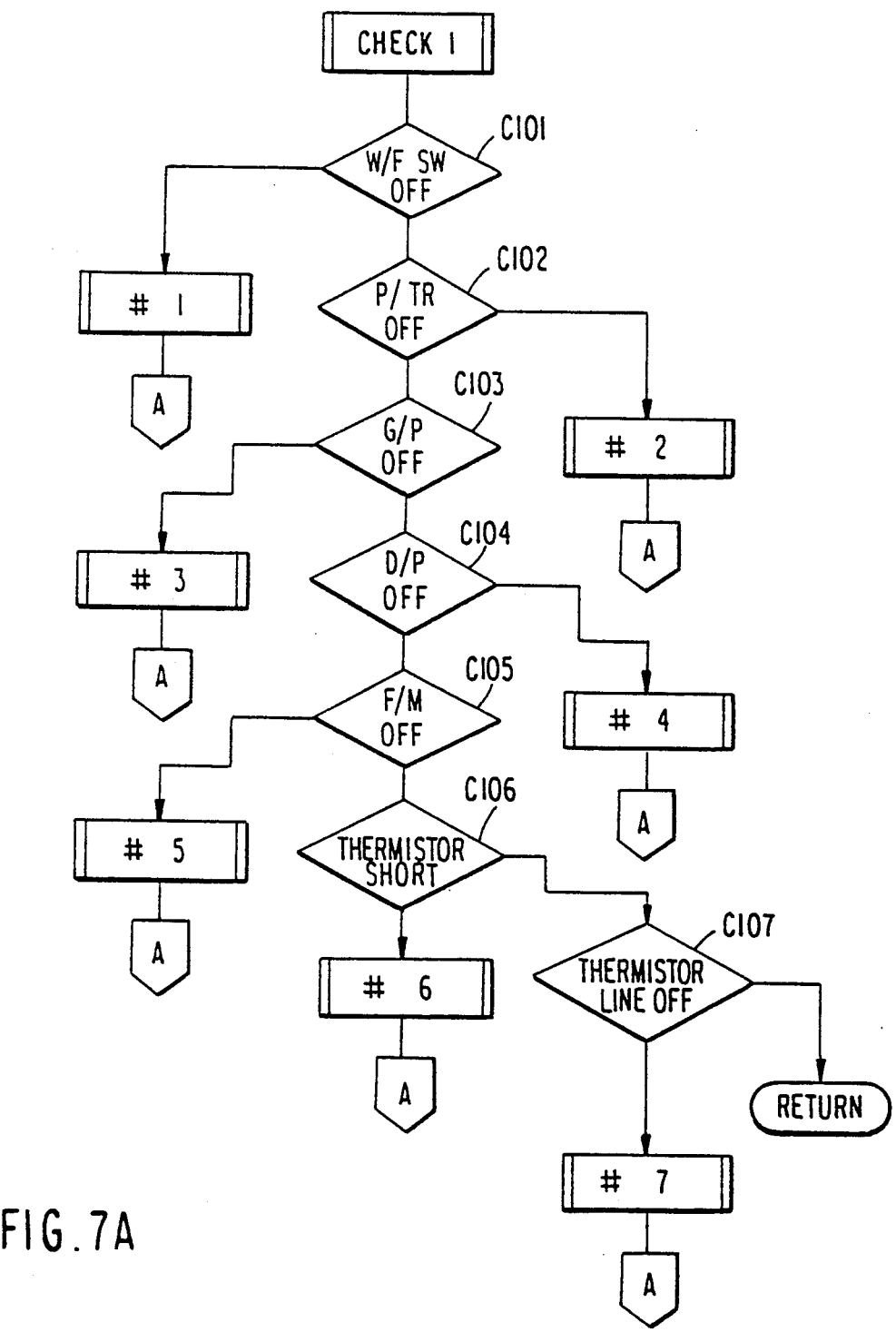

If the hand operated switch (SW) is "On", then the interrupt for the first checking step (check 1) is performed. The flow diagram for the first checking step is shown in FIG. 7A.

The principal process for the first checking step (check 1) is to detect the unnecessary operation of the equipment in the initial operating state and to check whether the operation of the equipment (i.e., the water pump, the photo transistor, the ignition plug, the fuel pump, the fan motor and the thermistor) is normal, or whether any of the equipment is out of order. See FIG. 7A.

The operation of the first checking step will be described in more detail later.

If the operation of each part is normal in the first checking step, the main program is performed, and the output part of the water pump W/P (reference number 4) is given the signal to drive.

Accordingly, the water pump is turned "On" and heating water is circulated through a pipe line. In step 105, the hand operated switch SW is checked to assure that the switch SW is maintained in the "On" position. If the hand operated switch SW is "Off", the control is moved to the step of turning off the "On" light, and the stopping step is performed. In other words, the system is turned "Off".

If the hand operated switch is "On" at step 105, then the second checking step (check 2) is performed (step 106), wherein the sufficiency of the supplying voltage is checked. See FIG. 7B. After the second checking step (check 2) is completed, the temperature checking step is performed (step 107). The subroutine for the temperature checking step (i.e., "Temperature Detection") is shown in FIG. 9, and will be described in more detail below.

The temperature check is performed by a thermistor, which is used as a sensor in the present invention. The register value of the thermistor goes up as the temperature goes down. The thermistor selectively measures the engine preheating or the room heating temperature by comparing these temperatures against a standard voltage with a comparator. Various temperature levels may be used by changing the standard voltage of the comparator. In the present invention, the various temperature levels are 55° C., 70° C., 80° C. and 85° C.

Figure 9:
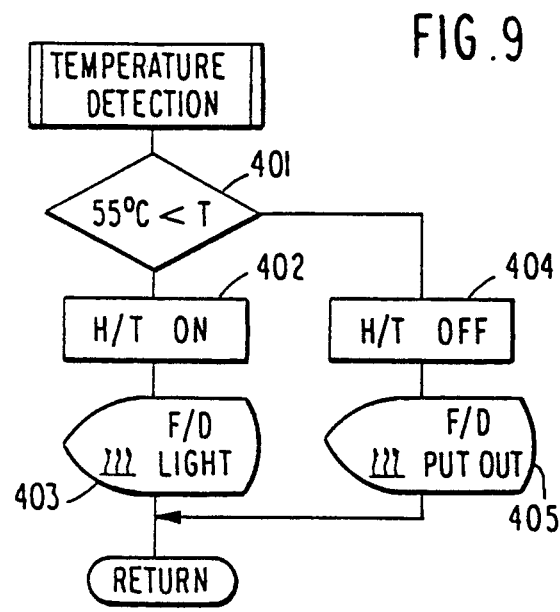
FIG. 9 is a flow chart for explaining the performance of the temperature checking step.
Figure 10D:
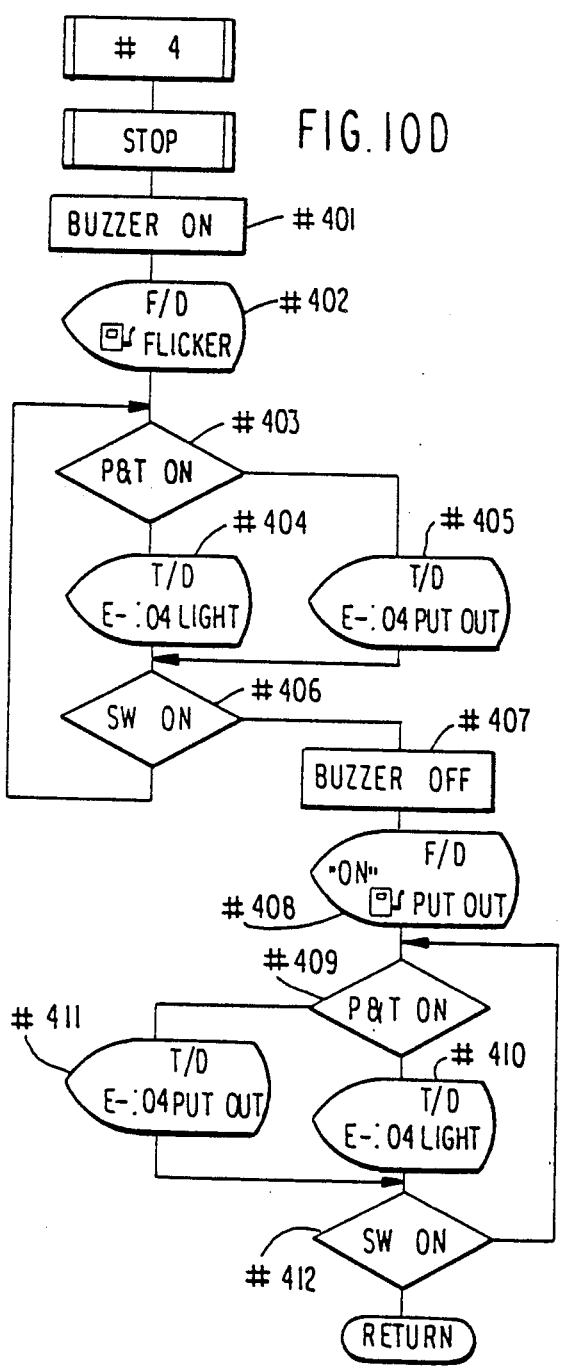
Figure 10C:
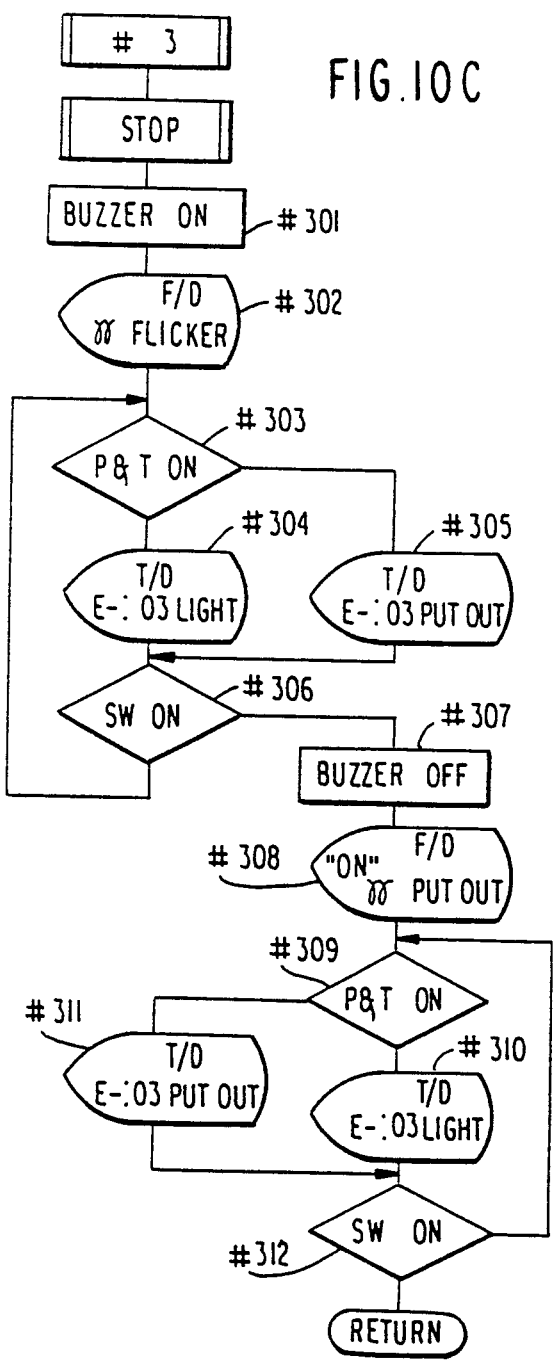
Figure 10E:
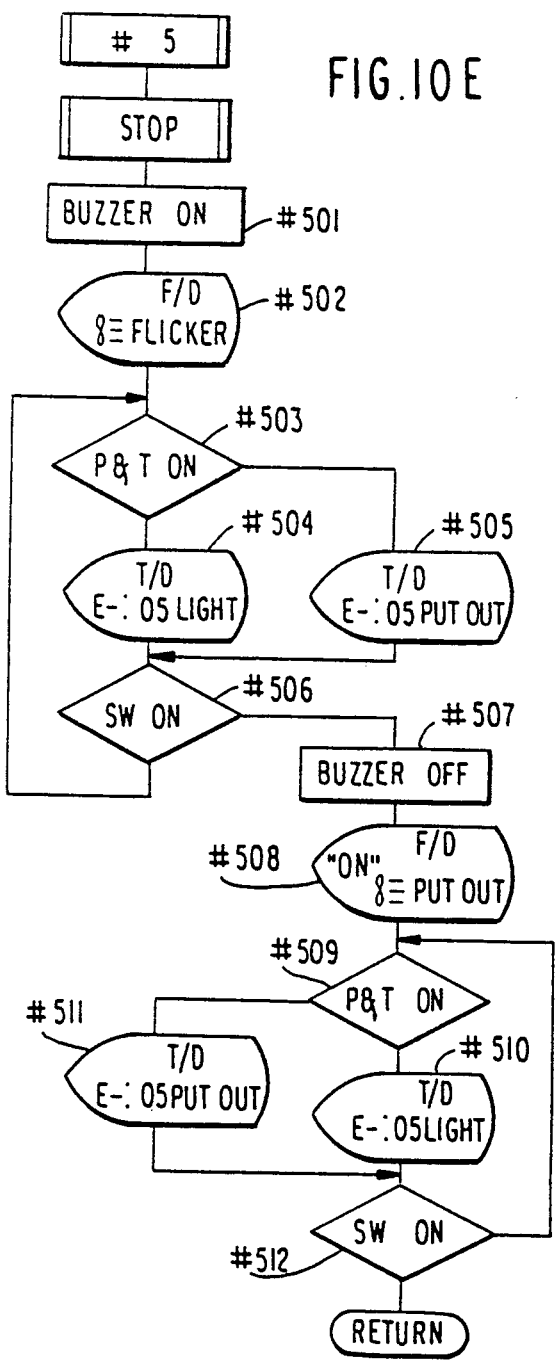
Figure 10F:
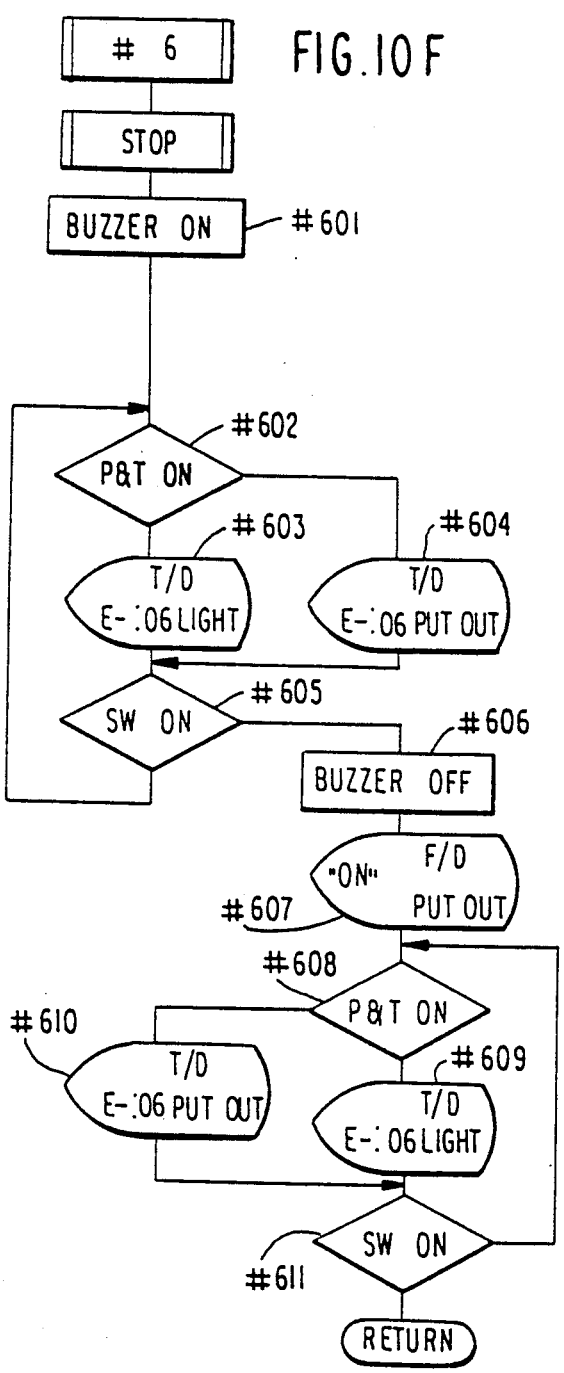
Figure 10G:
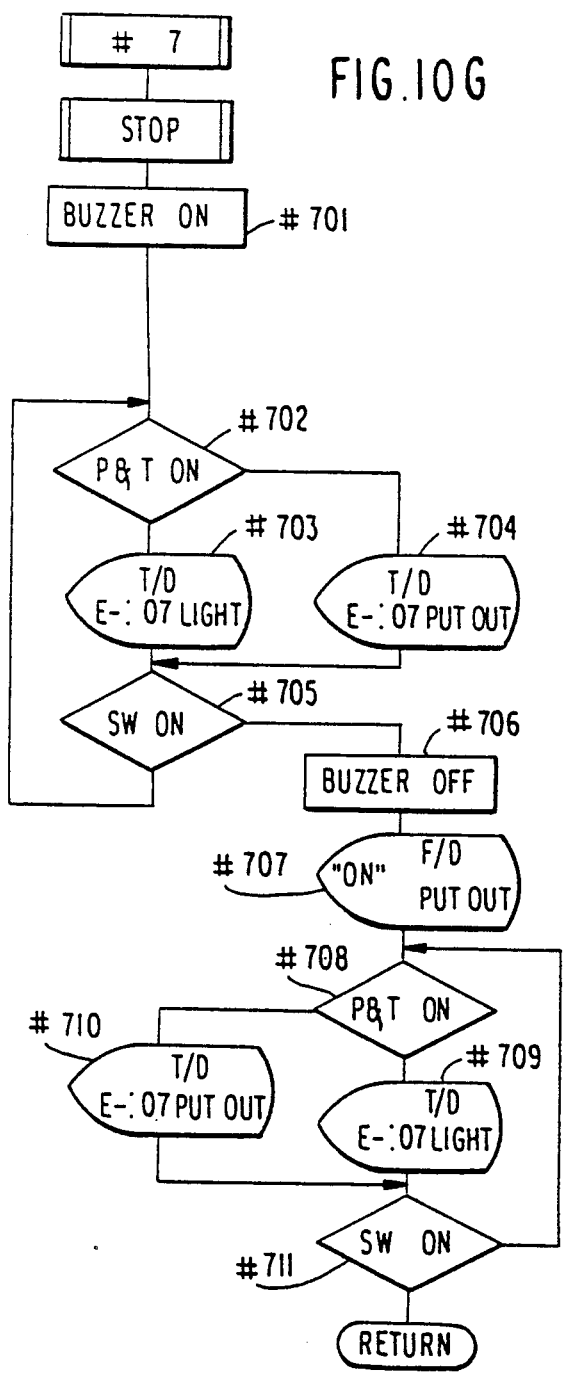
Figure 10H:
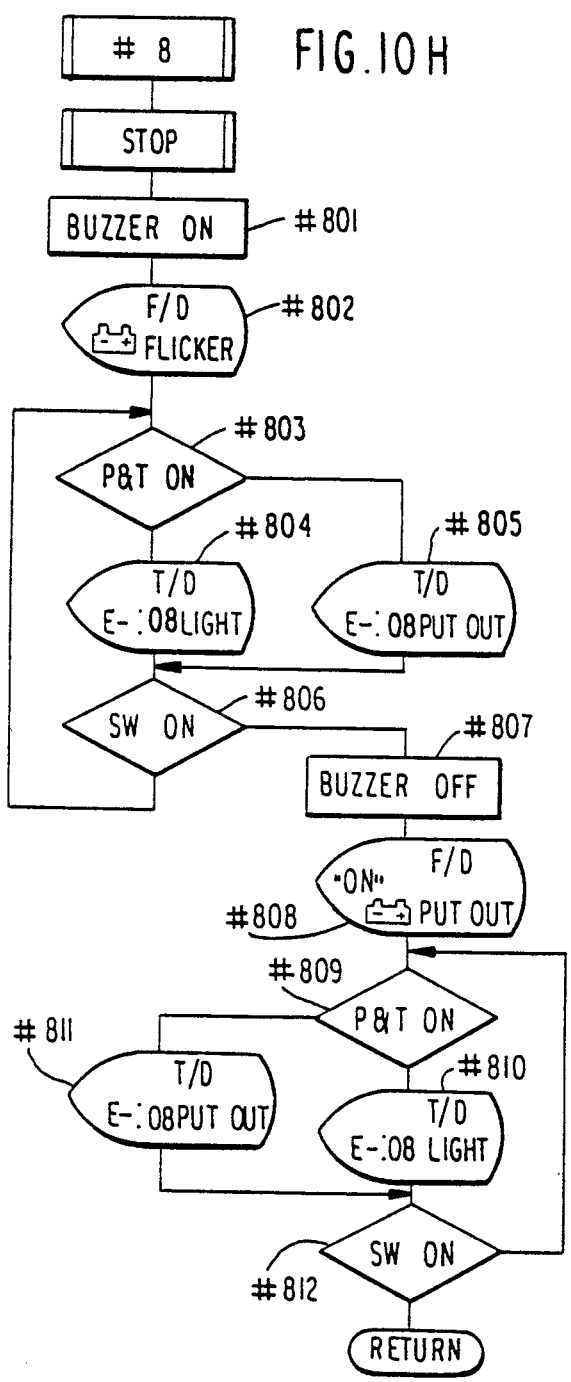
Figure 10:
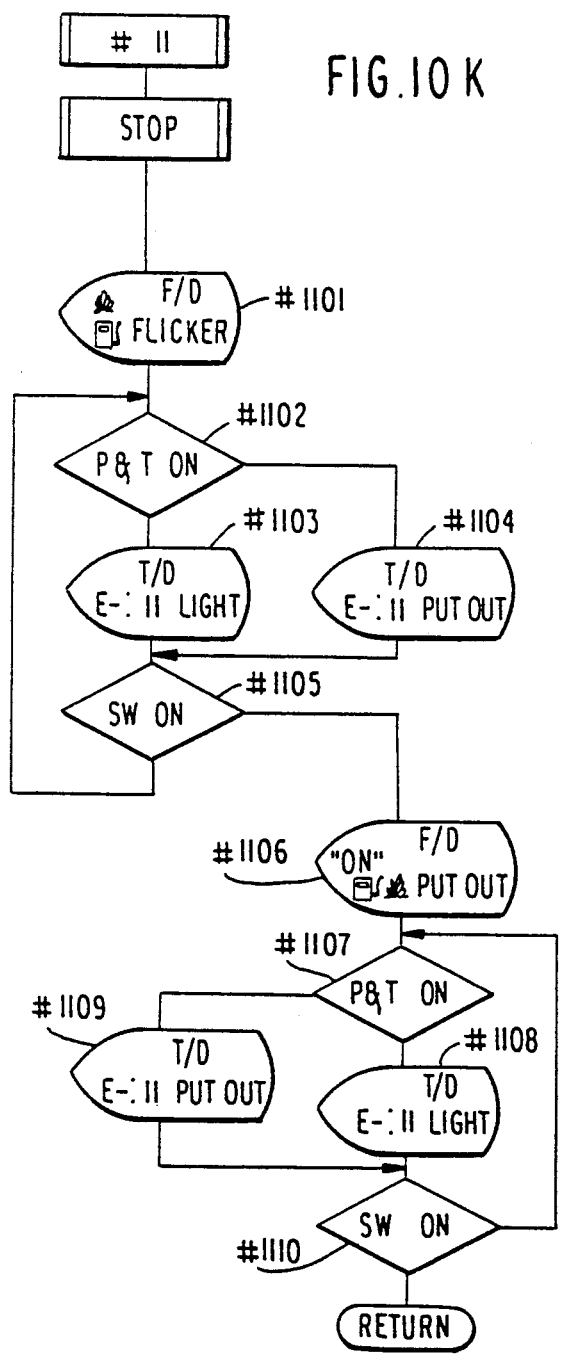
Figure 10:
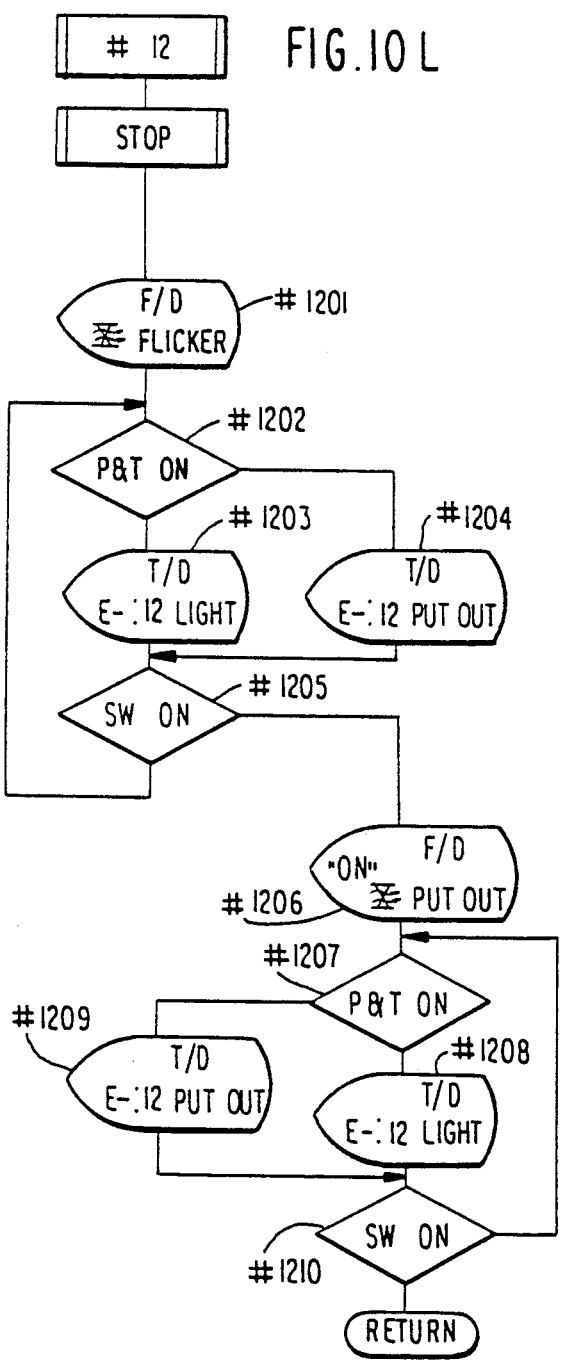

The subroutine for the temperature check, as shown in FIG. 9, receives input from the main program and checks whether the temperature detected in the thermistor is over 55° C. (step 401). If it is over 55° C., the room heater H/T is operated to the "On" state (step 402), and the output turns on the room heater lamp display F/D of the microprocessor (step 403). This operation cannot occur prior to the step of heating. If the temperature detected by the thermistor is below 55° C., the room heater H/T is turned OFF (step 404), and the display F/D remains extinguished (step 405). After the temperature check, the process is returned to the main program, and the controlling process is continued.

At this stage in the control process, the driving signal and the voltage of battery B+ to the output part 3 of the ignition plug G/P are given in series. Accordingly, the ignition plug G/P is turned "On" (step 108).

Next, the hand operated switch SW is checked, and if the switch SW is "Off", the stopping step is performed. If the switch SW is "On", the third checking step (check 3) is performed (step 110). See FIG. 7C. In the third checking step, if the temperature checked by the above mentioned temperature checking step (referring to FIG. 9) and the temperature of the heating water are below 85° C., the control process returns to the main program.

After the third checking step (check 3) is completed, the time of preheating for the ignition plug G/P is checked. To ignite in a fit fuel condition, the time for preheating is different depending upon the type of fuel used for the heating system. The present invention will be described based upon gasoline as the fuel.

An ignition plug G/P is preheated during a 15 second time period (step 111). While this time period is passing, the control is continuously performed by ignition plug G/P. In this manner, the firts preheating period is performed, and the hand operated switch SW, the water pump W/P and the ignition plug G/P are all turned "On".

Figure 3:
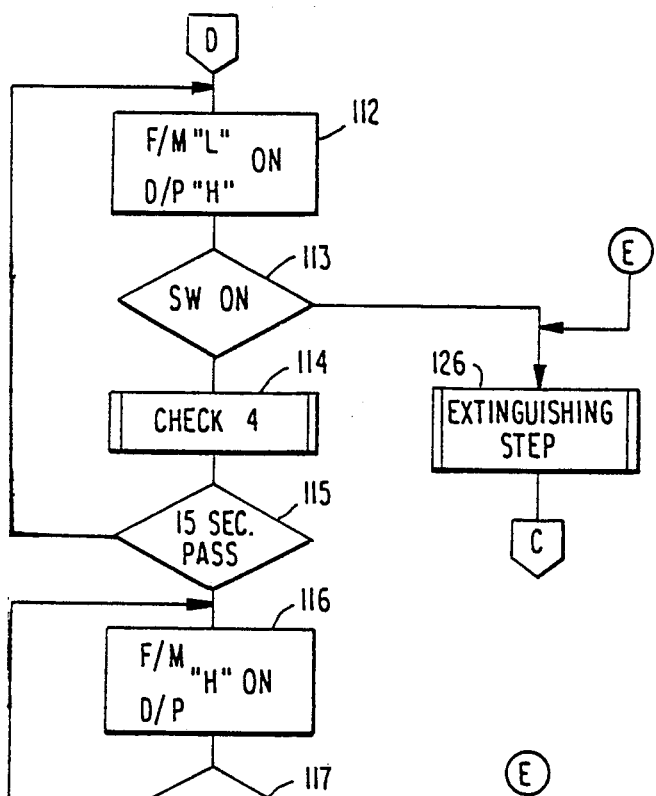
FIG. 3 is a flow chart for explaining the process of the ignition period as a control performance step in accordance with the present invention.

Meanwhile, the reduced speed of the fan motor for combustion air F/M (represented as signal "L" hereinafter) is driven and is connected to the ignition period step, as shown at step 112 in FIG. 3. At this time, the fuel pump D/P also starts (step 112). Pulses of about 6 Hz are supplied to the fuel pump D/P and the fuel pump is driven at a normal velocity H by the driving circuit.

At a first ignition time, the "L" signal for driving the fan motor F/M is maintained during about 15 seconds to enable easy ignition. The hand operated switch SW is again check (step 113), and if the switch SW is "Off", the fuel pump was already operated and, hence, the fuel was supplied. Therefore, ignition could be completed, and therefore, the control directs the performance of the extinguishing step (step 126), by transferring the process to C in FIG. 2, at step 105, and then to B in FIG. 2, and then to the stopping step (step 125), in that order. After this process, the operation of the heating system is stopped.

Figure 4:
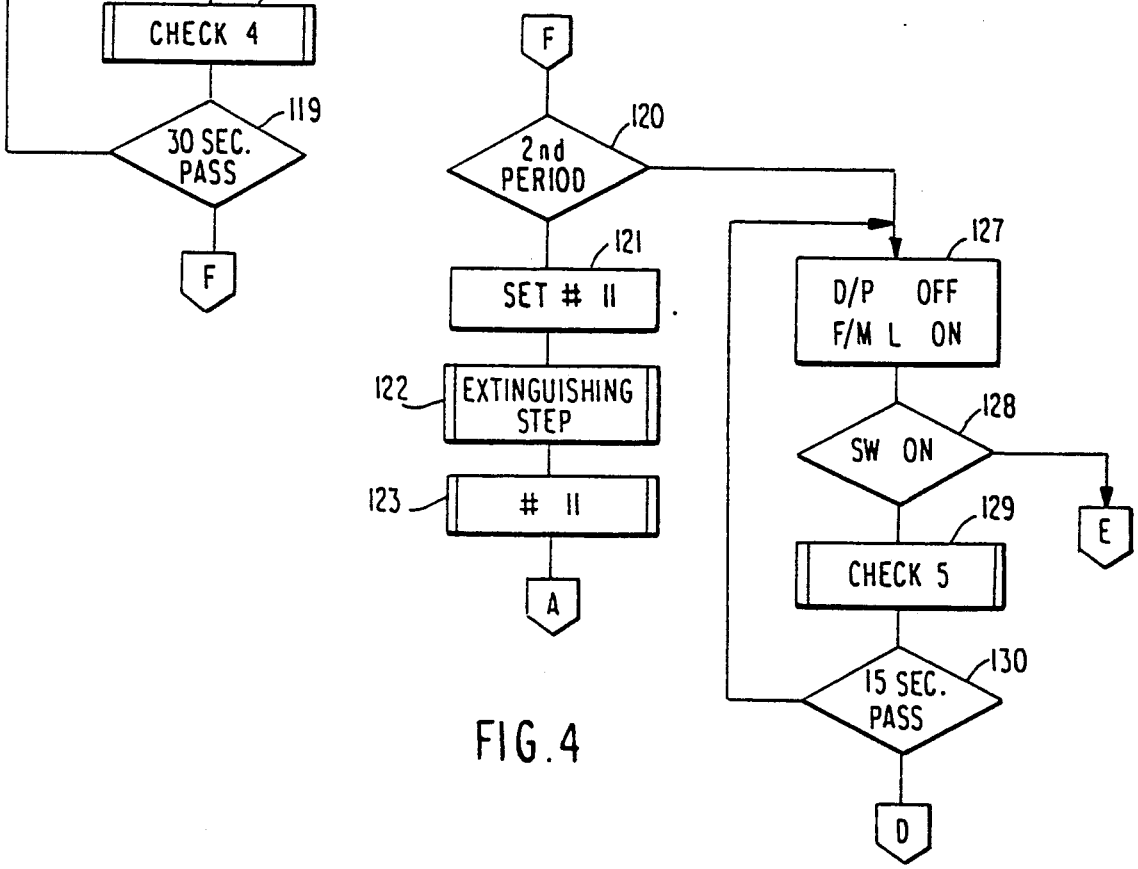
FIG. 4 is a flow chart for explaining the process of the second preheating period in accordance with the present invention.

Returning to step 113 shown in FIG. 3, the operation of the process will be described assuming that the state of the hand operated switch is "On". If the switch SW is on, the fourth checking step (check 4) is performed. See FIG. 7D. The fourth checking step is performed by the main program when the temperature of heating water is below 85° C. Again, the control process progresses continuously. After 15 seconds passes (step 115), the "L" operation time of the fan motor F/M is commenced, and the fan motor is operated at a normal velocity (represented as a signal "H" hereafter). If the state of hand operated switch SW is "Off" at step 117, the extinguishing step is performed. If the switch SW is "On", the fourth checking step of the control is performed again (step 118). An interrupt is generated by the combustion period (as will be described later) in the fourth checking step when the sensor part of ignition using the photo transistor P/TR as a checking device is operated. During this step, the control process is delayed for 30 seconds, as shown at step 119. After the 30 second delay time passes, if the ignition is not accomplished, the control for the second preheating process is performed, as shown in FIG. 4.

As known in prior inventions, the present invention includes a double preheating system to ignite twice repeatedly. Describing in more detail, the second preheating step first looks to see whether the control process comes from the first preheating step in which ignition was not accomplished, or from the second period step in which the second ignition was accomplished (step 120). If it comes from the second period step, the error code #11 is set in the memory means of the microprocessor (step 121). In case of an extinguishment because of error, the interrupt corresponding to the error code is generated. If the factor causing the disorder and interrupt is removed, the process returns to the first starting step A, shown in FIG. 2.

But if the control process does not come from the second period step at step 120, the fuel pump D/P is stopped, and the fan motor F/M changes to "L" operation (step 127), for the purpose of preparing to ignite again. At this point, the fifth checking step is performed (see FIG. 7E, step 129), if the hand operated switch is "On" (step 128). In this case, the ignition is implemented with fuel in flowed from the second period. In the fifth checking step, the invention is not checked by the photo transistor, and if the temperature of the heating water is below 85° C., the second ignition is performed by the "L" ignition mentioned above, after a delay lasting 15 seconds. If the ignition is not accomplished in the second period, as explained above, the control process directs the performance of the extinguishing step (step 122), and the remainder of the process is like that described above.

But, when using the process in accordance with the present invention, there are few occasions where the system will not be able to ignite through the second period. Therefore, the description below will be centered around the combustion period.

Figure 5:
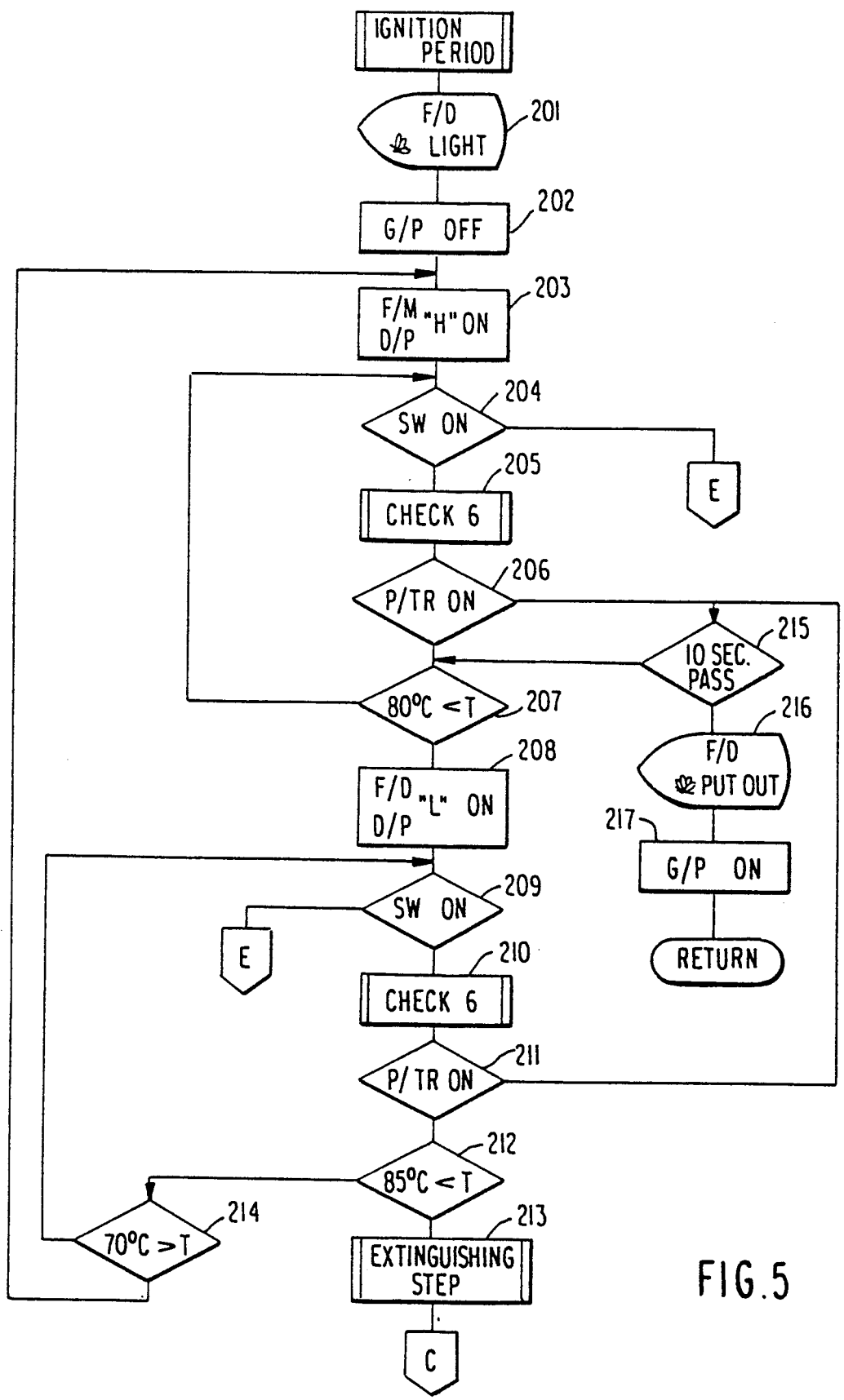
FIG. 5 is a flow chart for explaining the process of the combustion period in accordance with the present invention.

In the subroutine shown in FIG. 5, if the ignition is accomplished in the furnace, the light indicating combustion is turned on (step 201) and the ignition plug G/P is turned "Off" (step 202).

At this time, the output of the microprocessor leads the fan motor F/M to the "H" state and the fuel pump D/P to the state of 6 Hz "H". Therefore, the "On" state is maintained (step 203), and the combustion of "H" is performed. When the hand operated switch SW (step 204) is "On", the sixth checking step is performed (step 205), as shown in FIG. 7F, and generally, the driving means of the heating system is checked.

In the next step (step 206) the state of the photo transistor P/TR is checked. When the photo transistor P/TR is "Off", when checking combustion state of the photo transistor P/TR, the progress of the program is delayed for 10 seconds (step 215), and the light indicating combustion (F/D) is extinguished (step 216).

The ignition plug G/P, to which the supplying voltage can be presented, is again driven into the state of "On" (step 217) and the control process is returned to the main program.

But, if the photo transistor P/TR is in the "On" state, the temperature of the heating water is checked to determine if it is above 80° C., as the third step. If the heating water temperature is below 80° C., the fan motor F/M and fuel pump D/P are continuously driven in the "H" state, as shown in step 203.

In this condition, if room heating is implemented (it was mentioned above that heater H/T is driven if the temperature of the heating water is above 55° C. in the temperature checking subroutine), the temperature of the heating water will be over 80° C. to the point that the heat of the boiler is in excess of that of the heating.

Accordingly, in the present invention is desired that "L" driving is performed by the fan motor F/M and the fuel pump D/P, as shown at step 208.

This present heating system maintains heating by driving often and by not totally extinguishing the heat source.

Continuing with the control process, when the state of the hand operated switch SW is "On" (step 209), the sixth checking step is again performed (step 210), and after the sixth checking step, the output from the ignition sensor of the photo transistor P/TR is checked and is input into the microprocessor. The highest temperature of the heating water in this invention is 85° C. This temperature limit is checked at step 121. The water temperature, as described above, is determined by comparing it to a reference voltage in a comparator in the thermistor.

If the temperature of the heating water is not 85° C. at step 212, it is checked to see whether the temperature is below 70° C. at step 214. If it is below 70° C., then the amount of heat is increased by placing the state of combustion to "H" as mentioned above at step 203. If the temperature is above 70° C., the "L" state is maintained. At any point, if the temperature increases above 85° C., the process changes to perform the extinguishing step.

If the period of combustion is ended, the process returns to point C, at step 105 shown in FIG. 2. If the state of the hand operated switch SW is "Off", respective driving parts 2, 3, 4, 5 and 6 come to the off position as shown in FIG. 8, and the display is put out. The process returns to the first state.

The following is a detailed description of the subroutine for the extinguishing step which is mentioned above in the control program. The flow diagram for the extinguishing step is shown in FIG. 6.

The control process progresses to the extinguishing step when the heating is performed to the appropriate value by the first and second preheating steps, the ignition period, and the combustion period; when the hand operation is over; when the reserved operation is over; when the troubles are determined by the inner elements of the control apparatus; and when the outer elements such as the driving element are input or checked.

Figure 6:
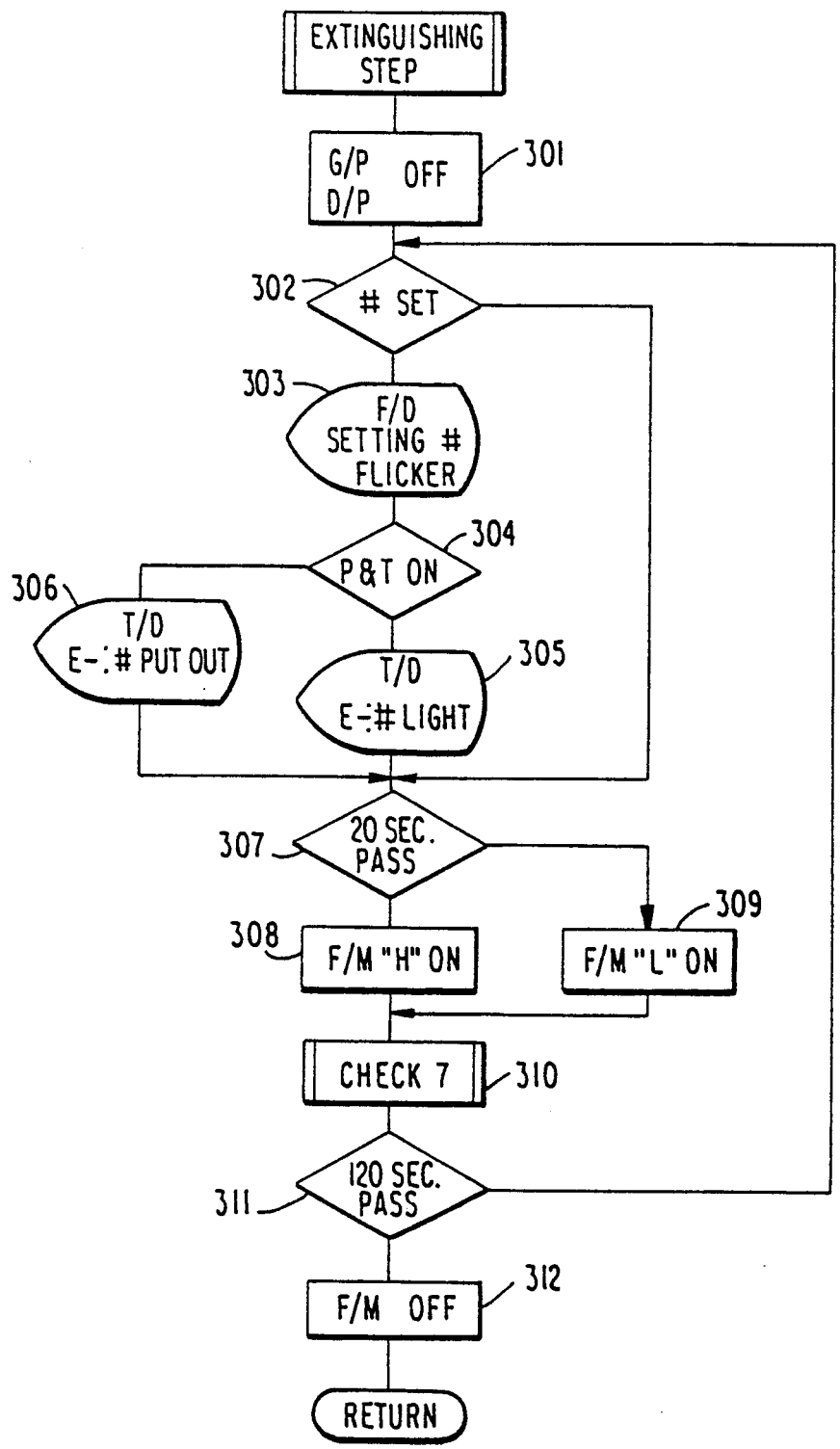
FIG. 6 is a flow chart for explaining the process of the extinguishing step, according to the program interrupt, in accordance with the present invention.

When, as shown in FIG. 6, the ignition period or the preheating is performed, in this case the normal extinguishing operation is performed and the process returns to check to see if the hand operated switch is "On" (step 105; see FIG. 2). In the case where the extinguishing operation is caused because of error, the program returns to the corresponding error, and after this, the stopping step is performed.

In this extinguishing step, the fuel pump D/P and the ignition plug G/P are turned "Off" (step 301). In step 302 the process checks whether a corresponding error code is set in a memory means of the microprocessor. If there is an error code set, the output of the microprocessor is set so that the timer display is turned on or put out.

According to this displayed light, if the user push the program key PLUG and the timer key shown FIG. 11 simultaneously (step 304), the trouble element will be displayed on the time display T/D to detail the error.

Of course, if the extinguishing step is not performed as a result of an error, an error code will not be set (step 302). Accordingly, the fan motor F/M goes to the "L" state (step 309) if the program determines that less than 20 seconds have passed (step 307). If more than 20 seconds have passed, the remaining gas and unexpected substances in the furnace are drained therefrom by driving the fan motor F/M to the "H" state (step 308). After this, the seventh checking step is performed (step 310), and when 120 seconds have passed, the fan motor F/M, which was operated in the "H" state, is turned "Off" (step 312).

The return is performed whether the normal extinguishing step is performed or whether the extinguishing step is caused by an error, and after the extinguishing step is completed, this subroutine is ended.

The following is a description of the detailed steps for the various checking processes and error indicating codes. The first checking step will be explained with reference to FIG. 7A.

FIG. 7A represents the step for the self check of the initial steps of the heating process.

The water flow switch W/F SW, the photo transistor P/TR, the ignition plug G/P, the fuel pump D/P and fan motor F/M are checked to determine if they are on or off, and then, the thermistor is checked to determine whether it is shorted or open. If trouble is detected, the corresponding error codes (#1–#6) are called. If the thermistor is "Off", error code #7 is called. If any of the error codes (#1–#7) are called, the subroutine is stopped, and the subroutine corresponding to the appropriate error code is performed, as shown in Table 1. The process and indication of the respective errors will be described later.

Figure 7B:
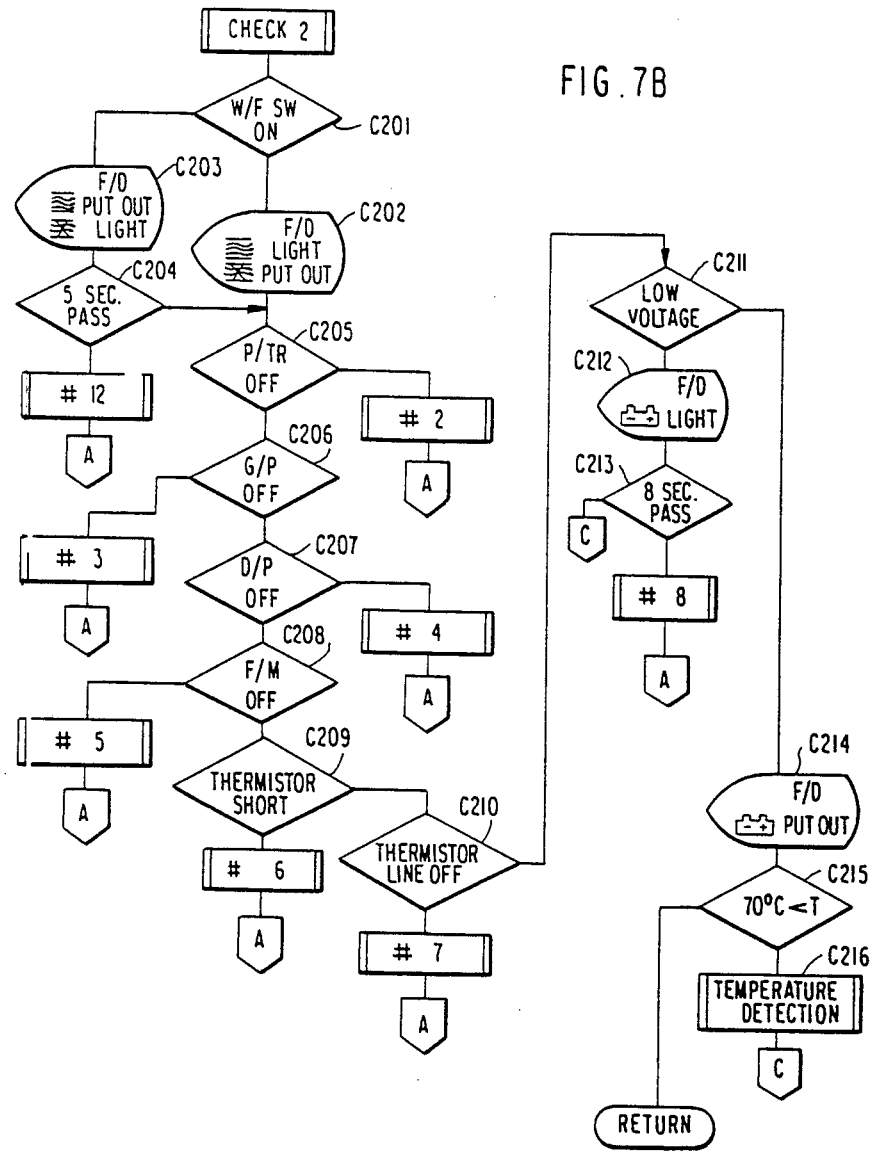

The subroutine which performs the second check is shown in FIG. 7B. First, the "On" state of the water flow switch W/F SW is checked, however, the second checking step progresses after the water pump of the main program starts. In other words, as shown in FIG. 2, the check 2 step (step 106) is performed after the water pump is switched on at step 104.

At this time, when the circulation of the heating water in the heating pipe line is not performed because of the lack of heating water, the water flow switch is turned "Off". Thus, the light indicating water circulation is turned off, and the light indicating what is not being circulated is turned on (step C203).

If 5 seconds is passed (step C204), then the program calls the corresponding error program and message. But if the water flow switch is turned "On" in normal operation, the display F/D lamp indicating circulation is turned on and the opposite lamp extinguished (step C202). From step C205 to step C210, the same steps as in the check of check 1 are performed. After step C210 a low voltage checking step (step C211) is performed for the first time in this control process.

In the present invention, the low voltage check is performed by means of comparator. When a sufficient supply voltage is given to drive the heating system, the warning light for a low voltage condition is extinguished (step C214) and the temperature detection step is performed. The process determines whether the temperature checked by the thermistor in "L" combustion is about 70° C., the lowest limited temperature. If above 70° C., with an interrupt by the temperature check, the room heater H/T is turned on and operated, and the process is connected to the main program. Accordingly, voltage is not supplied to the ignition plug G/P and the control process is circulated. But if below 70° C., the process returns to step 107 after ending the second check in the main program. When a low voltage is determined by the low voltage check at step C211, the warning light for low voltage is turned on (step C212).

At this time, if eight seconds passes (step C213), the error program is called, and if eight seconds do not pass control process returns to the main program. The normal operation of the driving part is checked repeatedly, therefore, self checking is performed.

The third checking step (check 3) is shown with reference to FIG. 7C. This checking step is performed in the first preheating step of the main program. It begins at a point in the main program after which the ignition plug G/P is driven (step 108 in FIG. 2) and the same check as in check 2 is repeated from step C301 to step C305. After step C305, assuming no error is indicated by this point, the process checks whether the step of the ignition plug G/P remains "On" (step C306).

Of course, if the ignition plug G/P is "Off", the system is out of order and the process is directed to perform the corresponding error code subroutine. But, if the operation is normal, the light for the ignition plug G/P is turned on. From step C308 to step C314, the second checking step operations (check 2) are repeated. At the end of this checking step, a temperature checking step (as shown in FIG. 9) is performed (step C315). As described above, when the temperature of the heating system is below 85° C. (step C316) then the process returns to the location in the main program. If the temperature is above 85° C., the ignition plug G/P is turned "Off" (step C317). In other words, the highest and lowest temperatures of the heating system are checked.

The fourth checking step (check 4) will be described with reference to FIG. 7D. This checking step is performed in the ignition period of the main program (see steps 114 and 118 in FIG. 3). The main difference between this checking step and the prior checking steps is that in the fourth checking step, the extinguishing step is performed when an error signal is generated.

Figure 7D:
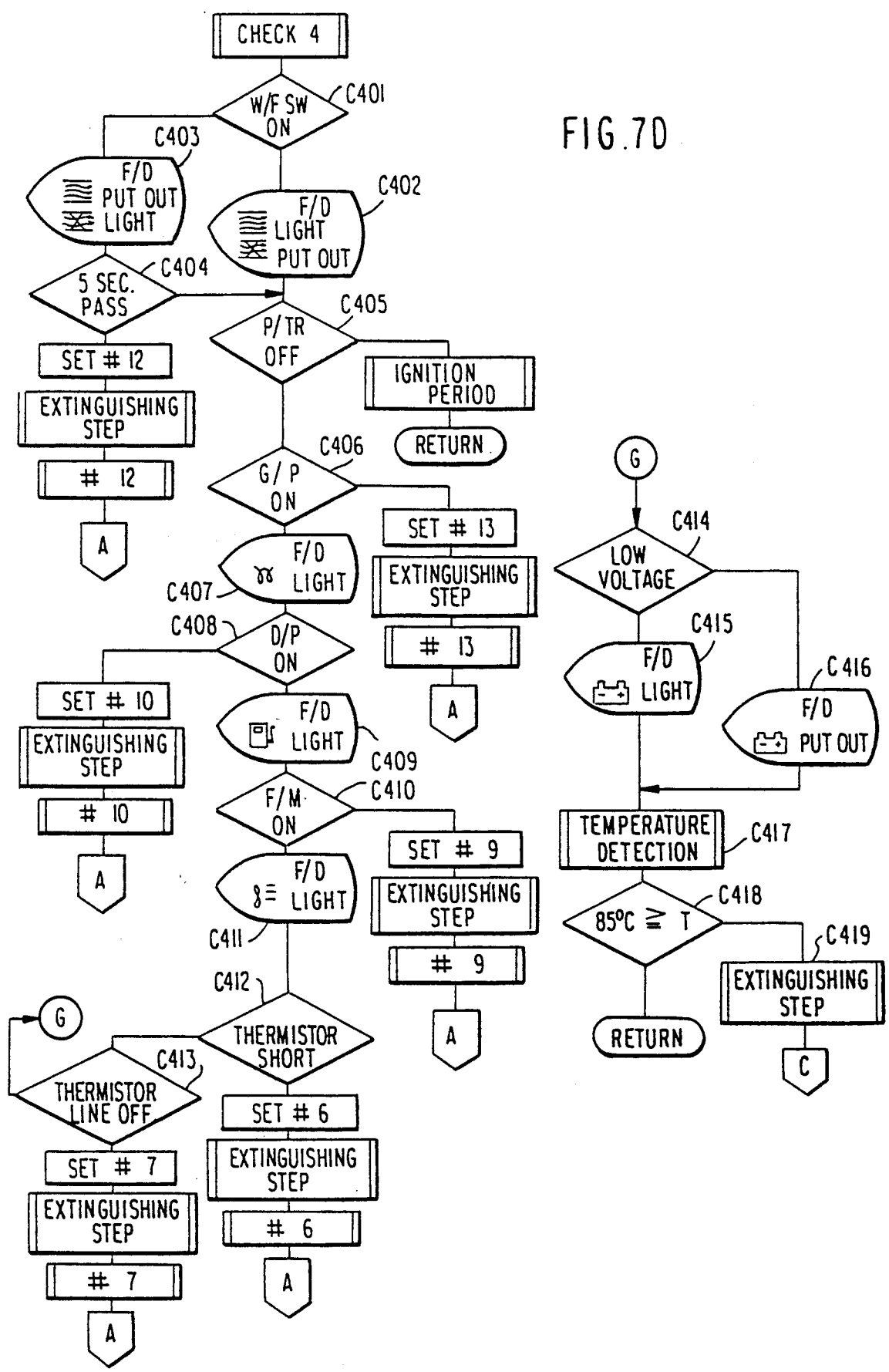

As shown in FIG. 7D the process checks whether the water flow switch is "On" (step C401). If the water flow switch is not on, the light indicating water circulation is extinguished, and simultaneously, the opposite light is turned on (step C403). After this, there is a delay for 5 seconds (step C404), and the error is set (SET #12) in the microprocessor, after which the extinguishing step is performed and the step indicating the error is performed. When the water flow switch is operating normally, according to the output of the water circulation sensor in the water flow switch, the microprocessor turns on the light indicating circulation, and puts out the opposite light on the display F/D (step C402). The process then checks with a photo transistor P/TR whether combustion is occurring (step C405), and if the state of the photo transistor is "On", the control is performed as in the combustion period (combustion period described above). At this time, if ignition is not made, the state of the ignition plug G/P is checked (step C406). If the ignition plug is in the "Off" state, an error is set in the microprocessor, and the extinguishing step is performed. The error is indicated (E-13), and the subdivided trouble elements are indicated by hand operation (will be described).

Again in step C406, if the state of the ignition plug G/P is "On", the light indicating operation of the ignition plug is turned on (step C407). The proper operation of the fuel pump D/P (step C408) is checked, and if it is not operating normally, the appropriate error code is set, and if operating normally, the light indicating fuel inflow is turned on (step C409). The state of the fan motor F/M (step C410) is checked next, and if "On", the light indicating operation of the fan motor F/M is turned on (step C411) and if the fan motor is "Off", the extinguishing step and the step indicating the error are performed.

After this, the steps as in the third checking step are performed (steps C412-C418). In the performance of the final step, if the temperature of the heating water is above 85° C. (step C418), combustion is stopped and the extinguishing step is performed. This check 4 is a double check passing through the "L" and "H" ignition in the process of the main program (steps 114 and 118, FIG. 3). In this manner, the self check is performed.

Figure 7E:
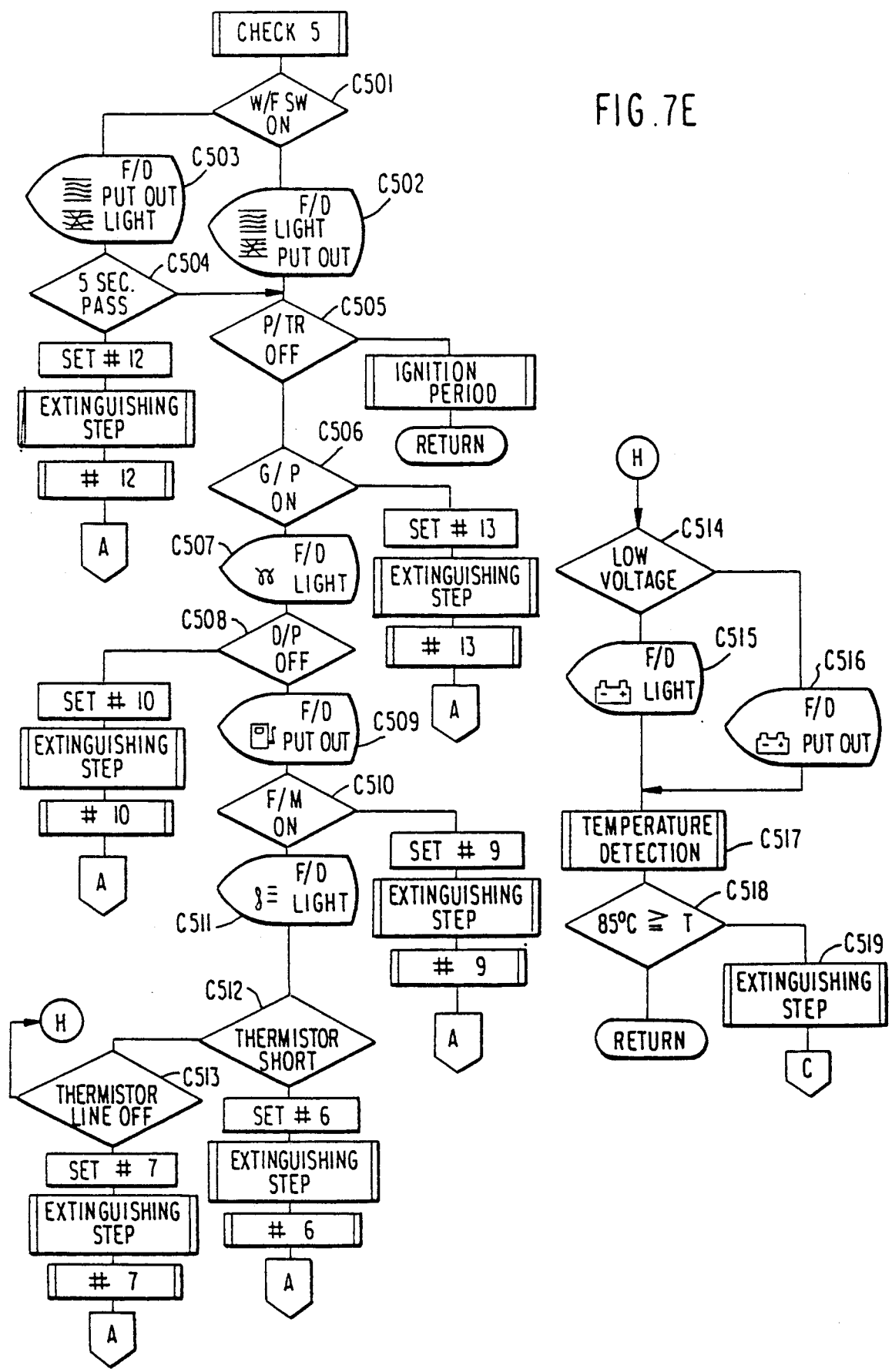
Figure 7F:
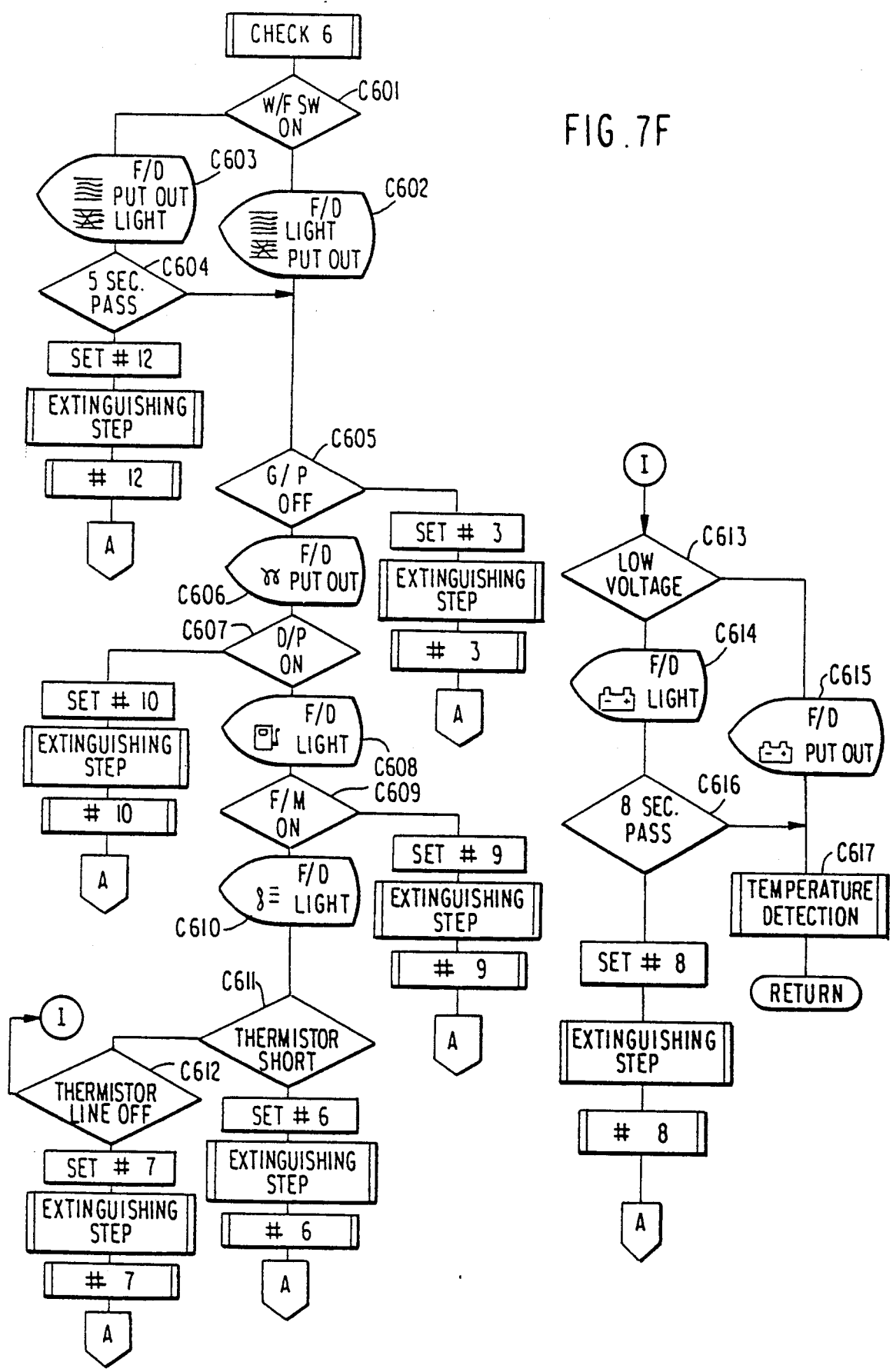
Figure 7G:
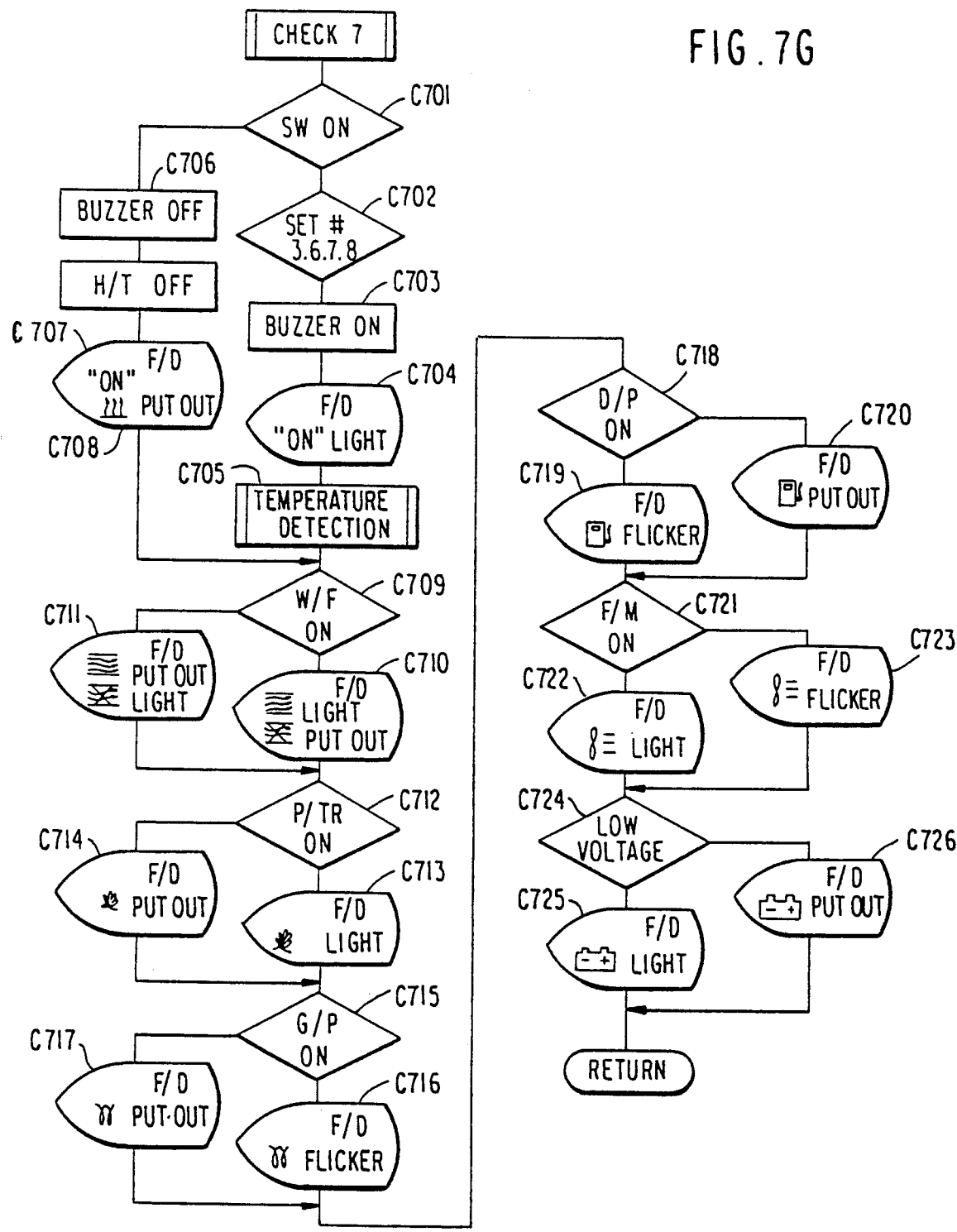

The fifth checking step (check 5) is performed in the second preheating step (see step 129, FIG. 4), and the fifth checking step is shown with reference to FIG. 7E. In the description of the main program progress, it was described that the state of the fuel pump D/P comes to "Off" in the second preheating step after failure of ignition in the first preheating step (see step 127, FIG. 4). Therefore, checking step 5 is different from check 4 in that the state of the fuel pump D/P is checked to see if it is off. At this time, if the fuel pump D/P is driven (step C508), this means error, and the process performs the error sequence (error 10). The remainder of check 5 is the same as check 4, and therefore the description of the remainder of check 5 will be omitted.

In the sixth checking step (check 6), as shown in FIG. 7F, the check is performed in the "H" and "L" combustion step of the main program (see steps 205 and 210, FIG. 5). At this time, the state of ignition plug G/P in the step of combustion, is normally in the "Off" position. The check for combustion by photo transistor is performed in the main program. Therefore, it is omitted from the sixth checking step. Step C601 to step C604 in check 6 are the same as the corresponding prior steps in the other checking steps. Here, because of the "H" or "L" combustion, the state "On" of the ignition plug is concluded to indicate an error (step C605). Steps C607-C612 are the same as those described in check 4. In the final process of check 6, an error by low voltage (step C613) is checked and, if in the normal range, a temperature detection check is performed, and the process is returned to the next step of the main program.

We observe the seventh checking step (check 7), which takes place during the extinguishing step (see step 310, FIG. 6).

Check 7 is the step in which display F/D and the buzzer are operated by errors generated from check 1 to check 6. Check 7 is described with references to FIG. 7F.

First of all, the state of the hand operated switch is checked (step C701) to see if it is "On" after an interrupt in the extinguishing step. If the hand switch is "On" the process checks to determine whether any of the errors memorized in the microprocessor corresponding to #3, #6, #7, #8 (step C702) are set. If any of these errors are set, the output of the microprocessor drives the buzzer (step C703). Control of buzzer output signal is slightly different, depending on the type of error encountered.

If the state of the hand operated switch S/W is "On", the "On" light is turned on (step C704) and the temperature check step mentioned above (step C705) is performed. If the temperature of the heating water is below 55° C., the process comes back to the seventh check and the state of the water pump W/F is checked (step C709). Depending on the state of the water pump, the light indicating water circulation and the opposite light are turned on or extinguished, as appropriate (steps C710 and C711). The photo transistor is checked next (C712) to determined if fuel remains in combustion, and to turn on the combustion light on the display F/D, or if no fuel remains, that light is extinguished. Ignition plug G/P and fuel pump D/P are also checked (steps C715 and C718) and if their state is "On", the system is out of order. Therefore, the corresponding light is turned on or extinguished (steps C716 and C719).

Also, the fan motor F/M needs to be operated continuously to draw off combustion gas in the furnace. That is, as was described above, the time need for the extinguishing operation is 120 seconds. If the state of the fan motor is "Off" (step C721), the system is out of order. Therefore, on display F/D, a corresponding light is turned on or extinguished (step C723). Finally, trouble by low voltage is checked (step C724), and the process comes back to the next step of check 7.

Table 1 shows the error indication and checking step according to the self check process. Table 1 shows the error code, the cause of the error, the time in the process of the checking step and the state of the buzzer operation when the hand switch S/W is "On".

TABLE 1

| error code | cause | checking step | Buzzer's operation at S/W ON. |
|---|---|---|---|
| E-01 | Line-shorted of water pump W/P | | Operation |
| E-02 | Line-shorted of photo transistor D/TR | | Operation |
| E-03 | Line-shorted of ignition plug G/P | after checking ignition | Operation |
| E-04 | Line-shorted of output parts of fuel pump D/P | | Operation |
| E-05 | Line-shorted of air Fan motor F/M | | Operation |
| E-06 | Line shorted of thermister | after fuel pump F/P ON | Operation |
| E-07 | Line-opened of thermister | after fuel pump F/P ON | Operation |
| E-08 | Low-Voltage | checking ignition | Operation (for combustion) |
| E-09 | Line-opened of Fan motor F/M | after fuel pump F/P ON | |
| E-10 | Line-opened of output part of fuel pump D/P | after fuel pump F/P ON | |
| E-11 | No checking ignition | after 2nd ignition period | |
| E-12 | Line-opened of Water pump W/P | after fuel pump F/P On | |
| E-13 | Line-opened of ignition plug G/P | after fuel pump F/P On | |

The above Table puts in order the error code, the checking step, and the operation of not of the buzzer, and flow diagrams for these errors are shown in more detail in FIG. 10(A) to FIG. 10(M).

Referring to FIG. 10(A) to FIG. 10(M) and the above Table, each error performs, at first, the above mentioned stopping step to stop the heating system. By this, when trouble is detected, a preferential disposal is performed and a dangerous situation is avoided. A check of error #1–#8 accompanies the buzzer operation. Meanwhile, a light corresponding to each error type is turned on or extinguished on display F/D, and the elements of trouble are indicated. The display includes an audible sound and a visible indicator. When subdivided trouble is found, by operating the program key PROG of the timer and time key TIME simultaneously, when the time display is "On", the corresponding error code is turned on (e.g., E-:01). By this, users recognize the problem and cope with trouble elements. Regardlesss if the state of the hand operated switch is "Off", the indication by self check is memorized in the microprocessor so that, simply by operating the two keys PROG and TIME, the error code is indicated, except it is not indicated on display F/D.

As described above, the present invention accurately checks the operating state of a heating system, and then indicates troubles and stops the control progress. Accordingly, the present invention controls problems and troubles of inner elements which conventional heating systems have, and indicates trouble by performing by self check operations.

What is claimed:

1. A method for self-checking and controlling a heating system, comprising:
   performing first heating system checking steps during a first preheating period, prior to ignition of the fuel for the heating system;
   turning on a water pump and an ignition plug during said first preheating period;
   turning on a fan motor and a fuel pump during an ignition period;
   during said ignition period, performing second heating system checking steps in order to detect error conditions in said heating system;
   if an error condition is detected as a result of said second checking steps, performing an extinguishing step during said ignition period and indicating said detected error condition;
   otherwise if no error condition is detected during said ignition period, performing a first igniting step for the heating system fuel;
   entering a second preheating period if ignition does not occur in said first igniting step, wherein said fuel pump is shut off during said second preheating period;
   performing third heating system checking steps during said second preheating period;
   if an error condition is detected as a result of said third checking steps, indicating an error detected during said second preheating period;
   otherwise if no error condition is detected during said second preheating period, performing a second igniting step for the heating system fuel; and
   performing an extinguishing step if ignition does not take place during said second igniting step.

2. The method according to claim 1, wherein said first heat system checking steps during said first preheating period include:
   a checking step to detect unnecessary operation of equipment and to check for normal operation of said equipment;
   a checking step to check for a low voltage condition, and to check for circulation of fluid by said water pump; and
   a checking step to check the temperature of heating water used in said heating system and to check to that said ignition plug is on.

3. The method according to claim 1, wherein said first preheating period includes a temperature detection step.

4. The method according to claim 1, wherein said second heating system checking steps during said ignition period include checking that said water pump and ignition plug are on prior to said first igniting step.

5. The method according to claim 2, wherein said second heating system checking steps during said ignition period include a checking step to assure that said water pump and ignition plug are on, prior to said first igniting step.

6. The method according to claim 5, wherein said checking step to assure that said water pump and ignition plug are on is performed again prior to said second preheating step if ignition does not occur after said first igniting step, another ignition step being conducted in said ignition period, prior to entering said second preheating step.

7. The method according to claim 1, wherein said third heating system checking steps during said second preheating period include a checking step to assure that said fuel pump is shut off during said second preheating step, if ignition does not occur in said first igniting step.

8. The method according to claim 5, wherein said third heating system checking steps during said second preheating period imclude a checking step to assure that said fuel pump is shut off during said second preheating step, if ignition does not occur in said first igniting step.

9. The method according to claim 1, wherein after ignition of said heating system fuel, a combustion period is entered.

10. The method according to claim 9, wherein said combustion period includes a checking step to assure that said ignition plug is off and that a low voltage condition is not present.

11. The method according to claim 8, wherein after ignition of said heating system fuel, a combustion period is entered.

12. The method according to claim 11, wherein said combustion period includes a checking step to assure that said ignition plug is off and that a low voltage condition is not present.

13. An apparatus for self-checking and controlling a heating system through a preheating period and an ignition period, which heating system includes a water pump, an ignition plug, a fan motor, and a fuel pump, said apparatus comprising:

means for actuating said water pump and said ignition plug during a first preheating period;

means for actuating said fan motor and said fuel pump during said ignition period;

means for indicating error conditions;

means for performing system checks for detecting error conditions in said heating system and causing said indicating means to indicate detected errors, said system checking means checking said heating system during said first preheating period, during said ignition period, and if fuel ignition does not occur during said ignition period, during a second preheating period after said ignition period;

means responsive to said system checking means during said ignition period for causing fuel ignition in the absence of a detected error during said ignition period, and responsive to said system checking means during said second preheating period for causing fuel ignition in the absence of a detected error during said second preheating period; and means for extinguishing in said heating system if said system checking means detects error conditions in said system during said ignition periods, or if said ignition causing means fails to cause fuel ignition after said second preheating period.

14. An apparatus according to claim 13, wherein said system checking means comprises a microprocessor.

15. An apparatus according to claim 13, wherein said indicating means include a display.

16. An apparatus according to claim 15, wherein said indicating means includes an audible alarm.

17. An apparatus according to claim 13, wherein said system checking means includes and ignition plug output sensor, a water pump output sensor, a fan motor output sensor and a fuel pump output sensor.

18. An apparatus according to claim 13, wherein said system checking means includes a water temperature sensor and a low voltage sensor.

* * * * *